US007340009B2

(12) United States Patent
Giannakis et al.

(10) Patent No.: US 7,340,009 B2
(45) Date of Patent: Mar. 4, 2008

(54) SPACE-TIME CODING FOR MULTI-ANTENNA ULTRA-WIDEBAND TRANSMISSIONS

(75) Inventors: Georgios B. Giannakis, Minnetonka, MN (US); Liuqing Yang, Falcon Heights, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 756 days.

(21) Appl. No.: 10/796,563

(22) Filed: Mar. 8, 2004

(65) Prior Publication Data

US 2004/0202256 A1 Oct. 14, 2004

Related U.S. Application Data

(60) Provisional application No. 60/453,810, filed on Mar. 8, 2003.

(51) Int. Cl.
*H04L 27/00* (2006.01)
(52) U.S. Cl. ............ 375/299; 375/267; 375/347; 455/101
(58) Field of Classification Search ........ 375/267, 375/299, 347; 455/101
See application file for complete search history.

(56) References Cited

U.S. PATENT DOCUMENTS

| 6,556,621 B1 * | 4/2003 | Richards et al. ............ 375/150 |
| 6,744,832 B2 | 6/2004 | Miao |
| 6,925,109 B2 * | 8/2005 | Richards et al. ............ 375/150 |
| 7,068,715 B2 | 6/2006 | Hoctor et al. |
| 2001/0053175 A1 | 12/2001 | Hoctor et al. |
| 2003/0069025 A1 | 4/2003 | Hoctor et al. |
| 2003/0108133 A1 | 6/2003 | Richards |
| 2003/0198212 A1 | 10/2003 | Hoctor et al. |
| 2003/0198308 A1 | 10/2003 | Hoctor et al. |
| 2004/0156421 A1 | 8/2004 | Yamaguchi |

OTHER PUBLICATIONS

Kumar, "Application of layered space-time processing to ultrawideband communication", The 2002 45th Midwest Symposium on Circuits and Systems, 2002. MWSCAS-2002. vol. 3, Aug. 4-7, 2002 pp. III-597-600 vol. 3.*

Z. Wang et al., "Block Precoding for MUI/ISI-Resilient Generalized Multicarrier CDMA with Multirate Capabilities," IEEE Transactions on Communications, vol. 49, No. 11, pp. 2016-2027, Nov. 2001.

(Continued)

*Primary Examiner*—Mohammed Ghayour
*Assistant Examiner*—Juan Alberto Torres
(74) *Attorney, Agent, or Firm*—Shumaker & Sieffert, P.A.

(57) ABSTRACT

Space-time (ST) coding techniques are described for multi-antenna transmissions in ultra-wideband (UWB) communication systems. The ST coding schemes may, therefore, be tailored for dense multipath channels. The techniques may be applied with linear and nonlinear modulation, coherent and noncoherent reception, and block interleaving of symbols. An UWB communication system is described that includes an ST encoder at the transmitter, multiple transmit and receive antennas, and two-step maximum ratio combining (MRC) at the receiver. The two-step MRC enables the receiver to collect full spatial and multipath diversity from a transmission. Two coding schemes for an UWB system with two transmit antennas and one receive antenna are described. Multiple antenna transmissions of ST encoded symbols increase the amount of diversity a receiver is able to collect without increasing the complexity of the receiver.

27 Claims, 14 Drawing Sheets

OTHER PUBLICATIONS

F. Ramirez-Mireles et al., "System Performance Analysis of Impulse Radio Modulation," Procedings Radio Wireless Conference, Colorado Springs, CO, pp. 67-70, Aug. 1998.

M. Win et al., "Ultra-Wide Bandwidth Time-Hopping Spread-Spectrum Impulse Radio for Wireless Multiple-Access Communications," IEEE Transactions on Communications, vol. 48, No. 4, pp. 679-691, Apr. 2000.

A. Saleh et al., "A Statistical Model for Indoor Multipath Propagation," IEEE Journal on Selected Areas in Communications, vol. SAC-5, No. 2, pp. 128-137, Feb. 1987.

B. Hassibi et al., "On the Expected Complexity of Sphere Decoding," Proceedings of the Asilomar Conference on Signals, Systems and Computers, vol. 2, pp. 1051-1055, 2001.

B. Hochwald et al., "Unitary Space-Time Modulation for Multiple-Antenna Communications in Rayleigh Flat Fading," IEEE Transactions on Information Theory, vol. 46, No. 2, pp. 543-564, Mar. 2000.

C. Le Martret et al., "All-Digital PPM Impulse Radio for Multiple-Access Through Frequency-Selective Multipath," Procedures of GLOBECOM, vol. 1, pp. 22-26, San Francisco, CA, Nov. 17-Dec. 1, 2000.

C.J. Le Martret et al., "All-Digital Impulse Radio with Multiuser Detection for Wireless Cellular Systems," IEEE Transactions on Communications, vol. 50, No. 9, pp. 1440-1450, Sep. 2002.

C.J. Le Martret et al., "All-Digital PAM Impulse Radio for Multiple-Access Through Frequency-Selective Multipath," Procedure of Sensor Array and Multichannel Signal Processing Workshop, Boston, pp. 77-81, Mar. 2000.

D. Cassioli et al., "Performance of Low-Complexity Rake Reception in a Realistic UWB Channel," 2002 IEEE International Conference on Communications, pp. 763-767, New York City, N.Y., Apr. 28-May 2, 2002.

E. Homier et al., "Rapid Acquisition of Ultra-Wideband Signals in the Dense Multipath Channel," G.E Research Development Center, Technical Information Series, pp. 105-109, Jan. 2002.

F. Gini et al., "Frequency Offset and Symbol Timing Recovery in Flat-Fading Channels: A Cyclostationary Approach," IEEE Transactions On Communications, vol. 46, No. 3, pp. 400-411, Mar. 1998.

F. Ramirez-Mireles et al., "Multiple Access With Time-Hopping and Block Waveform PPM Modulation," 1998 IEEE International Conference on Communications, vol. 2 of 3, pp. 775-779, Atlanta, Georgia, Jun. 1998.

G. Leus et al., "MUI-Free Receiver for a Synchronous DS-CDMA System Based on Block Spreading in the Presence of Frequency-Selective Fading," IEEE Transactions on Signal Processing, vol. 48, No. 11, pp. 3175-3188, Nov. 2000.

G.B. Giannakis et al., "AMOUR-Generalized Multicarrier Transceivers for Blind CDMA Regardless of Multipath," IEEE Transactions on Communications, vol. 48, No. 12, pp. 2064-2076, Dec. 2000.

H. Lee et al., "Multipath Characteristics of Impulse Radio Channels," 2000 IEEE 51st Vehicular Technology Conference Proceedings, Tokyo, Japan, pp. 2487-2491, May 15-18, 2000.

J.D. Choi et al., "Performance of Autocorrelation Receivers for Ultra-Wideband Communications with PPM in Multipath Channels," 2002 IEEE Conference on Ultra Wideband Systems and Technologies, pp. 213-217, Baltimore, MD, USA, May 2002.

J.D. Choi et al., "Performance of Ultra-Wideband Communications With Suboptimal Receivers in Mulipath Channels," IEEE Journal on Selected Areas in Communications, vol. 20, No. 9, pp. 1754-1766, Dec. 2002.

J.K. Cavers, "An Analysis of Pilot Symbol Assisted Modulation for Rayleigh Fading Channels," IEEE Transactions On Vehicular Technology, vol. 40, No. 4, pp. 686-693, Nov. 1991.

J.R. Foerster, "The Effects of Multipath Interference on the Performance of UWB Systems in and Indoor Wireless Channel," IEEE VTS 53rd Vehicular Technology Conference, vol. 2, pp. 1176-1180, Rhodes, Greece, May 6-9, 2001.

J.R. Foerster et al., "Ultra-Wideband Technology for Short- or Medium-Range Wireless Communications," Ultra-Wideband Technology for Short- or Medium-Range Wireless Communications, pp. 1-11, Apr. 2001.

K.Siwiak et al., "Ultra-Wide Band Radio: The Emergence of An Important New Technology," IEEE VTS 53rd Vehicular Technology Conference, vol. 2, pp. 1169-1172, Rhodes, Greece, May 6-9, 2001.

L. Yang et al., "Multistage Block-Spreading for Impulse Radio Multiple Access Through ISI Channels," IEEE Journal on Selected Areas in Communications, vol. 20, No. 9, pp. 1767-1777, Dec. 2002.

L. Yang et al., "Space-Time Coding for Impulse Radio," 2002 IEEE Conference on Ultra Wideband Systems and Technologies, pp. 235-239, Baltimore, MN, May 20-23, 2002.

L. Yang et al., "Impulse Radio Muliple Access Through ISI Channels With Multi-Stage Block-Spreading" 2002 IEEE Conference on Ultra Wideband Systems and Technologies, pp. 277-281, Baltimore, MD, May 21-23, 2002.

L. Yang et al., "Optimal Pilot Waveform Assisted Modulation for Ultrawideband Communications," IEEE Transactions on Wireless Communications, vol. 3, No. 4, pp. 1236-1349, Jul. 2004.

L. Yang et al., "Non-Data Aided Timing Acquisition of Ultra-Wideband Transmissions Using Cyclostationarity," 2003 IEEE International Conference on Acoustics, Speech and Signal Processing, Hong Kong, vol. IV of VI, Apr. 6-10, 2003.

M.Z. Win et al., "Impulse Radio: How it Works," IEEE Communications Letters, vol. 2, No. 2, pp. 36-38, Feb. 1998.

M.L. Welborn, "System Considerations for Ultra-Wideband Wireless Networks," 2001 IEEE Radio and Wireless Conference, pp. 5-8, Boston, MA, Aug. 19-22, 2001.

M.Z. Win et al., "On the Energy Capture of Ultrawide Bandwidth Signals in Dense Multipath Environments," IEEE Communications Letters, vol. 2, No. 9, pp. 245-247, Sep. 1998.

M.Z. Win et al., "Virtual Path Analysis of Selective Rake Receiver in Dense Multipath Channels," IEEE Communications Letters, vol. 3, No. 11, pp. 308-310, Nov. 1999.

M.Z. Win et al., "ATM-Based TH-SSMA Network for Multimedia PCS," IEEE Journal on Selected Areas in Communications, vol. 17, No. 5, pp. 824-836, May 1999.

O. Wintzell et al., "On the Capacity of a Pulse-Position-Hopped CDMA System," IEEE Transactions On Information Theory, vol. 47, No. 6, pp. 2639-2644, Sep. 2001.

P. Withington, II et al., "An Impulse Radio Communications System," Ultra-Wideband, Short-Pulse Electromagnetics, Brooklyn, NY, pp. 113-112, Oct. 1992.

R. Fleming et al., "Rapid Acquisition for Ultra-Wideband Localizers," 2002 IEEE Conference on Ultra Wideband Systems and Technologies, Baltimore, MD, pp. 245-249, May 21-21, 2002.

R.A. Scholtz, "Multiple Access with Time-Hopping Impulse Modulation," Communications On The Move, Boston, MA, USA, pp. 447-450, Oct. 1993.

R.T. Hoctor et al., "An Overview of Delay-Hopped, Transmitted-Reference RF Communications," GE Research and Development Center, Technical Information Series, pp. 1-29, Jan. 2002.

S. Adireddy et al., "Optimal Placement of Training for Frequency-Selective Block-Fading Channels," IEEE Transactions On Information Theory, vol. 48, No. 8, pp. 2338-2353, Aug. 2002.

S. Ohno et al., "Optimal Training and Redundant Precoding for Block Transmissions with Application to Wireless OFDM," IEEE Transactions on Communications, vol. 50, No. 12, Dec. 2002.

S. Zhou et al., "Space-Time Coding with Maximum Diversity Gains Over Frequency-Selective Fading Channels," IEEE Signal Processing Letters, vol. 8, No. 10, pp. 269-272, Oct. 2001.

S. Zhou et al., "Chip-Interleaved Block-Spread Code Division Multiple Access," IEEE Transactions on Communications, vol. 50, No. 2, pp. 235-248, Feb. 2002.

S.M. Alamouti, "A Simple Transmit Diversity Technique for Wireless Communications," IEEE Journal On Selected Areas In Communications, vol. 16, No. 8, pp. 1451-1458, Oct. 1998.

S.S. Kolenchery et al., "A Novel Impulse Radio Network for Tactical Wireless Communications," Procedures Milcom Conference, Bedford, MA, Oct. 1998.

S.S. Kolenchery et al., "Performance of Local Power Control in Peer-to-Peer Impulse Radio Networks With Bursty Traffic," IEEE Global Telecommunications Conference, vol. 2 of 3, Phoenix, AZ, USA, pp. 910-916, Nov. 3-8, 1997.

U. Fincke et al., "Improved Methods For Calculating Vectors of Short Length in a Lattice, Including a Complexity Analysis," Mathematics of Computation, vol. 44, No. 170, pp. 463-471, Apr. 1985.

V. Lottici et al., "Channel Estimation for Ultra-Wideband Communications," IEEE Journal on Selected Areas in Communications, vol. 20, No. 9, pp. 1638-1645, Dec. 2002.

V. Tarokh et al., "Space-Time Block Codes From Orthogonal Designs," IEEE Transactions on Information Theory, vol. 45, No. 5, pp. 1456-1467, Jul. 1999.

V. Tarokh et al., "Space-Time Codes for High Data Rate Wireless Communication: Performance Criterion and Code Construction," IEEE Transactions on Information Theory, vol. 44, No. 2, pp. 744-765, Mar. 1998.

W.M. Lovelace et al., "The Effects of Timing Jitter on the Performance of Impulse Radio," 2002 IEEE Conference on Ultra Wideband Systems and Technologies, pp. 251-254, Baltimore, MD, May 21-23, 2002.

X. Chen et al., "Monocycle Shapes for Ultra Wideband System," 2002 IEEE International Symposium on Circuits and Systems, vol. I of V, pp. I-597-I-600, Scottsdale, AZ, May 25-29, 2002.

Z. Tian et al., "Symbol Timing Estimation in Ultra-Wideband Communications," Procecures of 36th Asilomar Conference on Signals, Systems, and Computers, Pacific Grove, CA, Nov. 3-6, 2002.

Z. Wang et al., "Wireless Multicarrier Communications: Where Fourier Meets Shannon," IEEE Signal Processing Magazine, vol. 47, No. 3, pp. 1-21, May 2000.

Z. Wang et al., "Vandermonde-Lagrange Mutually Orthogonal Flexible Transceivers for Blind CDMA in Unknown Multipath," Procedures of Workshop on Signal Processing Advances in Wireless Communication, Annapolis, MD, pp. 42-45, May 9-12, 1999.

B. Parr et al., "A Novel Ultra-Wideband Pulse Design Algorithm," IEEE Communications Letter, vol. 7, No. 5, pp. 219-221, May 2003.

J. Romme et al., "On the Power Spectral Density of Time-Hopping Impulse Radio," 2002 IEEE Conference on Ultra-Wideband Systems and Technologies, Wyndham Baltimore Inner Harbor, pp. 241-244, May 2002.

M.Z. Win, "Spectral Density of Random UWB Signals," IEEE Communications Letters, vol. 6, No. 12, pp. 526-528, Dec. 2002.

J. Han et al., "A New Ultra-Wideband, Ultra-Short Monocycle Pulse Generator with Reduced Ringing," IEEE Microwave and Wireless Components Letters, vol. 12, No. 6, pp. 206-208, Jun. 2002.

J.S. Lee et al., "New Uniplanar Subnanosecond Monocycle Pulse Generator and Transformer for Time-Domain Microwave Applications," IEEE Transactions on Microwave Theory and Techniques, vol. 49, No. 6, pp. 1126-1129, Jun. 2001.

T.W. Parks et al., "Chebyshev Approximation for Nonrecursive Digital Filters with Linear Phase," IEEE Transactions on Circuit Theory, vol. CT-19, No. 2, pp. 189-194, Mar. 1972.

D. Kelly et al., "PulsON Second Generation Timing Chip: Enabling UWB Through Precise Timing," 2002 IEEE Conference on Ultra-Wideband Systems and Technologies, Wyndham Baltimore Inner Harbor, pp. 117-121, May 2002.

X. Luo et al., "Designing Optimal Pulse-Shapers for Ultra-Wideband Radios," Journal of Communications and Networks, vol. 5, No. 4, pp. 344-353, Dec. 2003.

J.R. Foerster, "The Performance of a Direct-Sequence Spread Ultra-Wideband System in the Presence of Multipath, Narrowband Interference, and Multiuse Interference," 2002 IEEE Conference on Ultra Wideband Systems and Technologies, Wyndham Baltimore Inner Harbor, pp. 87-92, May 2002.

B.M. Sadler et al., "On the Performance of UWB and DS-Spread Spectrum Communication Systems," 2002 IEEE Conference on Ultra Wideband Systems and Technologies, Wyndham Baltimore Inner Harbor, pp. 289-292, May 2002.

R.A. Scholtz, "Multiple Access with Time-Hopping Impulse Modulation," Communications on the Move, Conference Record vol. 2 of 3, MILCOM Conference, Boston, MA, pp. 447-450, 1993, Oct. 11-14, 1993.

Z. Wang, "Multi-Carrier Ultra-Wideband Multiple-Access with Good Resilience Against Multiuser Interference," 2003 Conference on Information Sciences & Systems, The John Hopkins University, Baltimore, MD, pp. 1-5, Mar. 2003.

D. Cassioli, et al., "Performance of Low-Complexity Rake Reception in a Realistic UWB Channel," 2002 IEEE International Conference on Communications, New York, NY, pp. 763-767, Apr. 28-May 2, 2002.

Z. Wang et al., "A Simple and General Parameterization Quantifying Performance in Fading Channels," IEEE Transactions on Communications, vol. 51, No. 8, pp. 1389-1398, Aug. 2003.

L. Yang et al., "Analog Space-Time Coding for Multiantenna Ultra-Wideband Transmissions," IEEE Transactions on Communications, vol. 52, No. 3, pp. 507-517, Mar. 2004.

I. Bergel et al., "Narrow-Band Interference Suppression in Time-Hopping Impulse-Radio Systems," 2002 IEEE Conference on Ultra Wideband Systems and Technologies, Wyndham Baltimore Inner Harbor, pp. 303-307, May 2002.

L. Yang et al., "Unification of Ultra-Wideband Multiple Access Schemes and Comparison in the Presence of Interference," The Thirty-Seventh Asilomar Conference on Signals, Systems & Computers, Pacific Grove, CA, pp. 1239-1243, Nov. 2003.

G. Durisi, et al., "Performance of TH and DS UWB Multiaccess Systems in Presence of Multipath Channel and Narrowband Interference," Procedure of International Workshop on Ultra Wideband Systems, Oulu, Finland, 5 pages, Jun. 2003.

Z. Wang et al., "Complex-Field Coding for OFDM Over Fading Wireless Channels," IEEE Transactions on Information Theory, vol. 49, No. 3, pp. 707-720, Mar. 2003.

A.V. Oppenheim, et al., Discrete-Time Signal Processing, 2nd Edition, Prentice Hall, Chapter 7, "Optimum Approximations of Fir Filters," pp. 486-511, 1999.

FCC Report and Order, In the Matter of Revision of Part 15 of the Commission's Rules Regarding Ultra-Wideband Trasmission Systems, FCC 02-48, pp. 7434-7553, Apr. 2002.

IEEE P802.15 Working Group for WPAN, Channel Modeling Sub-Committee Report Final, IEEE 802.15-02/368r5-SG3a, pp. 1-40, Nov. 2002.

L. Yang et al., "Digital-Carrier Multi-Band User Codes for Baseband UWB Multiple Access," Journal of Communications and Networks, vol. 5, No. 4, pp. 374-385, Dec. 2003.

M. Hamalainen et al., On the UWB System Coexistence With GSM900, UMTS/WCDMA, and GPS, IEEE Journal on Selected Areas in Communications, vol. 20, No. 9, pp. 1712-1721, Dec. 2002.

L. Zhao et al., "Performance of Ultra-Wideband Communications in the Presence of Interference," IEEE Journal on Selected Areas in Communications, vol. 20, No. 9, pp. 1684-1691, Dec. 2002.

S. Zhou et al., "Digital Multi-Carrier Spread Spectrum Versus Direct Sequence Spread Spectrum for Resistance to Jamming and Multipath," IEEE Transactions on Communications, vol. 50, No. 4, pp. 643-655, Apr. 2002.

P. Withington, "Impulse Radio Overview," Time Domain Corp., pp. 1-7, published in Jan. 1998.

Hovinen et al., "Ultra Wideband Radio Channel Modelling for Indoors," COST273 Workshop in Helsinki, 7 pages, May 29-30, 2002.

* cited by examiner

SPACE-TIME CODING FOR MULTI-ANTENNA ULTRA-WIDEBAND TRANSMISSIONS

This application claims priority from U.S. Provisional Application Ser. No. 60/453,810, filed Mar. 8, 2003, the entire content of which is incorporated herein by reference.

STATEMENT REGARDING FEDERALLY SPONSORED RESEARCH OR DEVELOPMENT

This invention was made with Government support under Subcontract #497420 awarded by the University of Delaware (Army Prime #DAAD19-01-2-011). The Government may have certain rights in the invention.

TECHNICAL FIELD

The invention relates to wireless communication techniques and, in particular, techniques that employ ultra-wideband (UWB) communication.

BACKGROUND

Ultra-wideband (UWB) communication has attractive features for baseband multiple access, tactical wireless communications and multimedia services. In general, an UWB transmission consists of a train of very short pulses occupying an ultra-wide bandwidth. The information is typically encoded via either linear pulse amplitude modulation (PAM) or nonlinear pulse position modulation (PPM). The ultra-wide bandwidth includes bandwidths that are licensed from the Federal Communication Commission (FCC) for other communication purposes. However, the short pulses of the UWB transmission appear as minimal noise to non UWB-systems operating within those licensed frequencies.

Conveying information with ultra-short pulses can cause UWB transmissions to resolve many paths and become rich in multipath diversity. Consequently, rake receivers have been designed to collect the available multipath diversity to enhance the performance of UWB communication systems. Since the received UWB waveform often contains many delayed and scaled replicas of the transmitted pulses, a large number of fingers are typically needed on the Rake receiver. However, the Rake receiver may not have enough separation within the spectrum to allow each finger to track a different path of the transmission. At some point, the number of fingers on the Rake receiver may become too dense, and the receivers may become dependant on each other. In that case, no more additional diversity may be gained even if the number of fingers on the Rake receiver increases.

Moreover, each of the resolvable multipath waveforms undergoes a different channel, which causes distortion in the received pulse shapes. In some situations, the Rake receiver must know certain characteristics of each channel in order to correlate the received waveform with the delayed and scaled replicas. As a result, both the design and the implementation of Rake reception for UWB devices can be complicated. Furthermore, UWB transmissions have been shown to be very sensitive to timing jitter in non-fading channels. UWB transmissions with Rake reception are particularly sensitive to mistiming even in multipath fading channels.

SUMMARY

In general, the invention is directed to space-time (ST) coding techniques for multi-antenna transmissions in ultra-wideband (UWB) communication systems. The ST coding techniques provide effective means of enabling spatial diversity, and thus increasing channel performance and capacity within the UWB system. The UWB communication system with ST coding includes multiple transmit and receive antennas. Multiple antenna transmissions of ST-encoded symbols increase the amount of diversity a receiver is able to collect without increasing the complexity of the receiver. For example, a Rake receiver may be able to collect more diversity from a multi-antenna transmission than a single antenna transmission of the same symbol without increasing a number of fingers on the receiver.

Conventional ST coding techniques primarily focus on digital transmissions in narrowband wireless systems. In some embodiments, the invention includes analog ST coding schemes tailored for dense multipath channels. The analog coding schemes are developed for the analog UWB system to eliminate the need for sampling at the receiver. In other embodiments, the ST coding techniques may be applied with linear and nonlinear modulation, coherent and noncoherent reception, and block interleaving of symbols.

Adding one or more transmit antennas to a conventional UWB communication system with one transmit antenna and one receive antenna increases the diversity order compared to the diversity collected in the conventional UWB system. For example, an ST coding scheme that simultaneously transmits the same symbol with different waveforms from each of two transmit antennas may double the diversity the receive antenna is able to collect. In another example, an ST coding scheme that simultaneously transmits a pair of consecutive symbols with alternate orders and different waveforms from each of the two transmit antennas is able to quadruple the diversity order collected by the receive antenna.

In one embodiment, a method comprises processing a stream of information-bearing symbols to form a plurality of symbol blocks. Each symbol block comprises one or more of the information bearing symbols. The method further comprises generating multiple ultra-wideband (UWB) waveforms from the symbol blocks, wherein each of the UWB waveforms convey the symbols of their respective symbol blocks as pulses repeated over a number of frames, and transmitting the UWB waveforms over different antennas as a space-time coded UWB communication.

In another embodiment, a wireless communication device comprises a space-time (ST) encoder that processes a stream of information-bearing symbols to form a plurality of ST-encoded symbol blocks, wherein each symbol block comprises one or more of the information bearing symbols. A plurality of pulse shapers generate multiple ultra-wideband (UWB) waveforms from the symbol blocks, wherein each of the UWB waveforms convey the symbols of their respective symbol blocks as pulses repeated over a plurality of frames. A plurality of antennas transmit the UWB waveforms over a wireless communication channel.

In another embodiment, a wireless communication device comprises a plurality of antennas to receive a plurality of space-time (ST) encoded ultra wideband (UWB) waveforms through a wireless communication channel, and a maximum ratio combining (MRC) unit that processes the ST encoded UWB signals and produces a stream of estimate symbols.

In another embodiment, an ultra-wideband communication system comprises a transmitter that outputs a plurality of space-time (ST) encoded ultra wideband (UWB) waveforms via a plurality transmit antennas, and a receiver that receives the plurality of ST-encoded UWB waveforms via a wireless communication channel. The receiver performs maximum ratio combining (MRC) on the UWB signals to produce estimate symbols.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
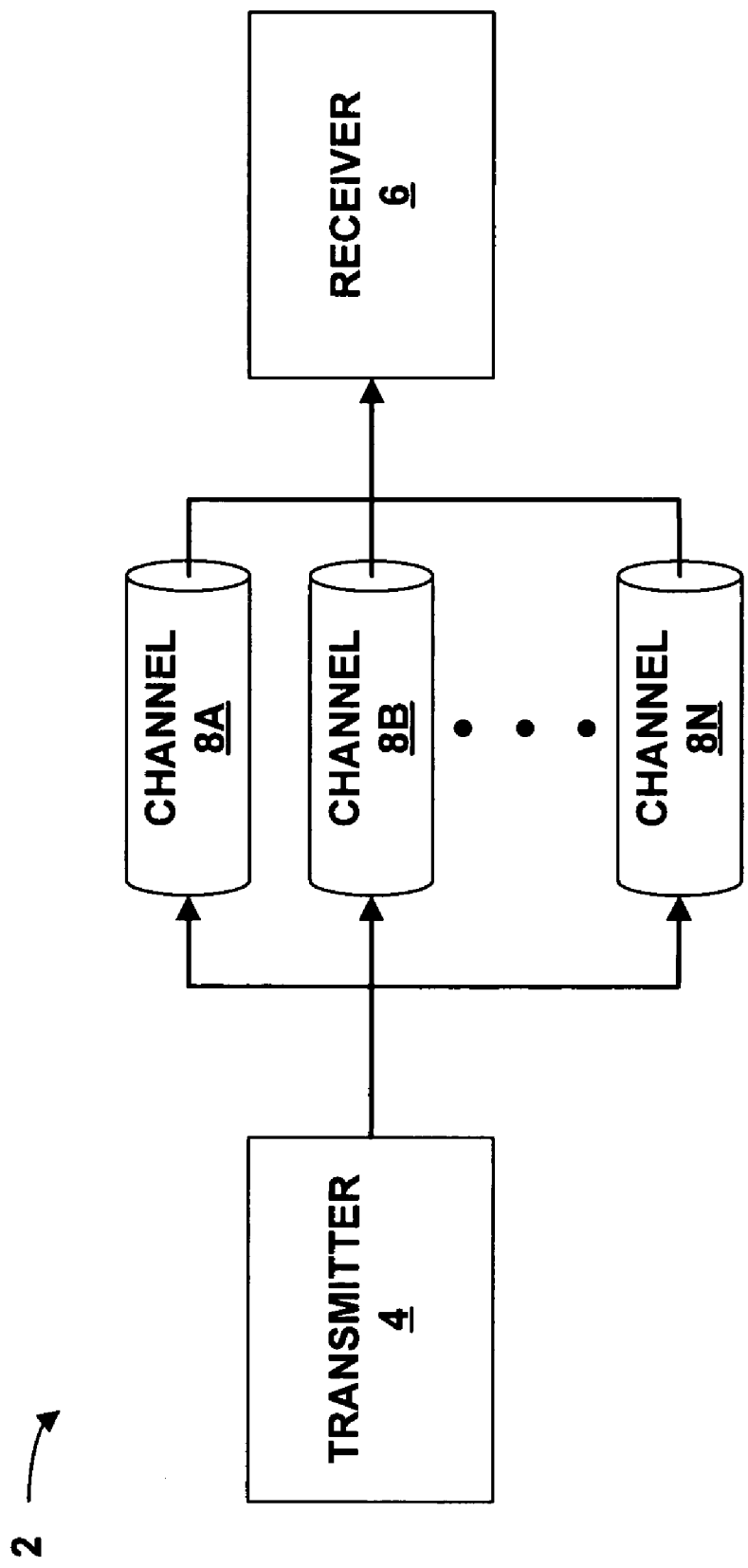
FIG. 1 is a block diagram illustrating an ultra-wideband (UWB) communication system.

FIG. 1 is a block diagram illustrating an ultra-wideband (UWB) communication system 2. UWB system 2 includes a transmitter 4, which communicates data to a receiver 6 by transmitting UWB waveforms through a plurality of channels 8A-8N (hereinafter, "channels 8"). Space-time (ST) coding techniques are applied in transmitter 4 to enable data symbols to be transmitted via multiple antennas. Transmitter 4 may include a plurality of transmit antennas and receiver 6 may include a plurality of receive antennas. Each of the transmit antennas corresponds to one of the channels 8 to transmit a ST-encoded UWB waveform from the transmit antenna to the receive antennas. The impulse responses of channels 8 may change from symbol to symbol.

Transmitter 4 includes an ST encoder and, in some embodiments, a frame interleaver within the ST encoder may be used to implement the ST coding schemes. The ST coding schemes may be analog and tailored for dense multipath channels. The UWB tailored ST coding schemes encode analog waveforms within symbols. ST coding for multi-antenna transmission increases performance and capacity of channels 8 by exploiting the spatial dimension, and allowing receiver 6 to collect both multipath diversity and spatial diversity.

Receiver 6 includes a maximum ratio combining (MRC) unit. The MRC unit performs MRC on UWB signals received by the receive antennas to collect spatial diversity as well as multipath diversity. In some embodiments, each of the plurality of receive antennas be associated with a corresponding Rake receiver. Each Rake receiver may generally be viewed as including L fingers configured to receive L paths of a UWB transmission waveform. In conventional UWB systems, the single antenna transmissions require a large number of fingers on the Rake receiver in order to collect enough diversity to accurately detect a received symbol. UWB system 2, as described herein, applies ST coding schemes for multi-antenna UWB transmissions to increase an amount of diversity collected at the receiver without increasing the overall required number of Rake fingers.

Transmitter 4 processes a stream of information-bearing symbols and transmits each ST-encoded data symbol as a train of very short pulses to receiver 6 using a modulation format, such as pulse amplitude modulation (PAM) or pulse position modulation (PPM). PAM is a linear modulation technique that requires knowledge of channels 8 at receiver 6. PPM is a non-linear modulation technique that does not generally require knowledge of channels 8 at receiver 6 when orthogonal PPM, or on-off keying (OOK), is employed.

Figure 2:
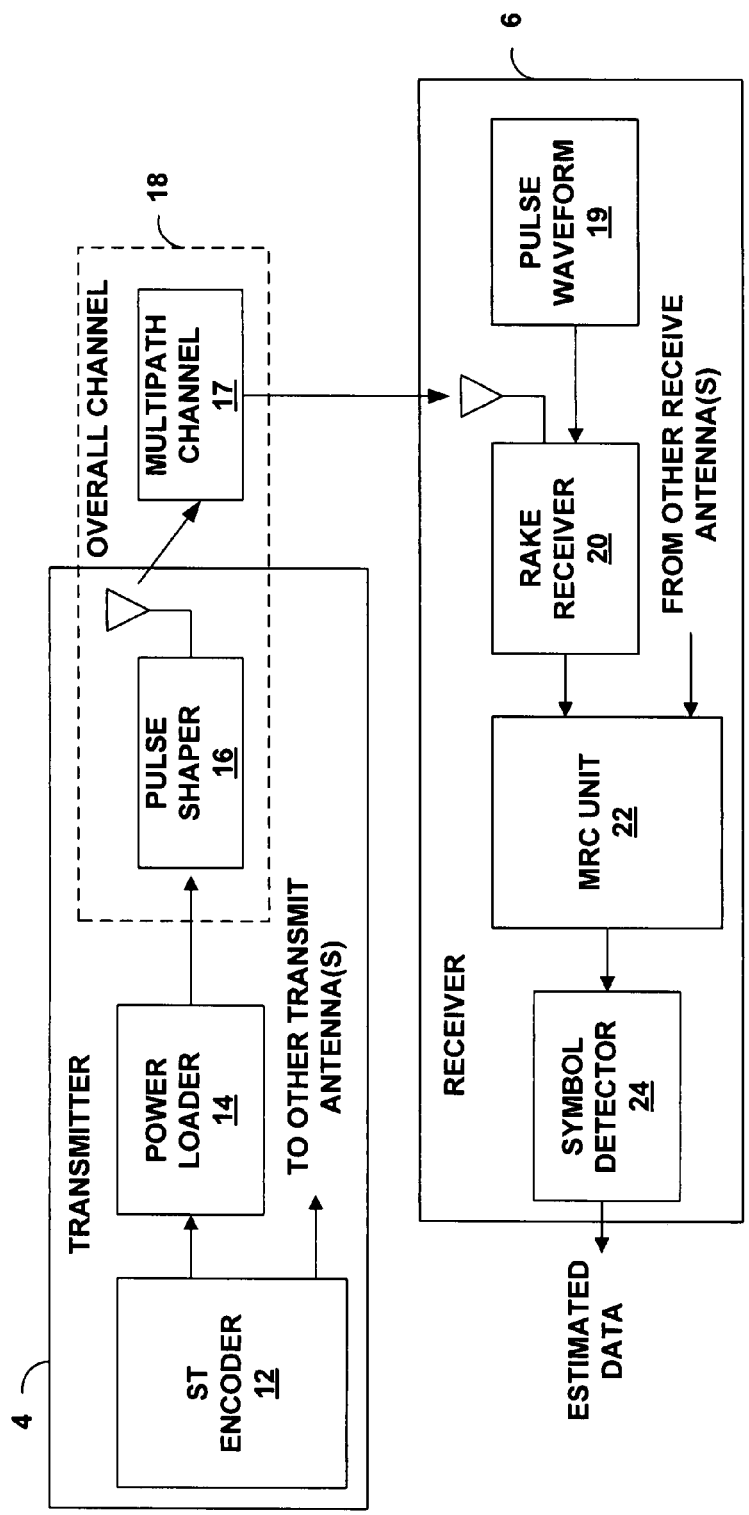
FIG. 2 is a block diagram illustrating an example multi-antenna UWB communication system.

FIG. 2 is a block diagram illustrating in further detail the example multi-antenna UWB communication system 2 (FIG. 1) in which transmitter 4 transmits ST-encoded UWB waveforms to receiver 6 via channels 8. In the illustrated embodiment, transmitter 4 comprises a ST encoder 12 that produces a stream of ST-encoded data symbols, and two or more transmit antennas. For each antenna, transmitter 4 includes a power loader 14 to power load the respective encoded stream of symbols produced by ST encoder 12, and a pulse shaper 16 that generates UWB pulse trains for transmitting the ST-encoded UWB signal through the respective one of the transmit antennas. An overall channel effect (herein, "the overall channel") may be represented as the convolution of the pulse shaper 16 and a respective physical multipath channel 17.

Receiver 6 comprises one or more Rake receivers 20, a MRC unit 22, and a symbol detector 24. The number of Rake receivers does not necessarily equal the number of transmit antennas included in transmitter 4. Rake receivers 20 receive the transmitted symbol as a noisy waveform, and utilize an input pulse waveform 19 for correlation with the received waveform. MRC unit 22 accepts the output of the one or more Rake receivers 20 and performs MRC to yield a decision statistic. Symbol detector 24 uses the decision statistic to determine an estimate of the original transmitted data symbols.

The UWB system 2, including the modulation, channel model, receiver structure, and detection method, will be described herein through the analysis of a single antenna transmission using PAM. The performance of single antenna transmissions not only serves as motivation to include ST coding for UWB multi-antenna communications, but also provides a benchmark for multi-antenna performance comparisons.

In general, transmitter 4 conveys the stream of binary information symbols as a stream of ultra-short pulses. With $N_t$ denoting the number of transmit antennas, every binary symbol $s=\pm 1$ is power loaded by power loader 14, pulse shaped by pulse shaper 16, and transmitted repeatedly over $N_f$ consecutive frames, each of duration $T_f$. Pulse shaper 16 employs a pulse waveform $w(t)$ with a typical duration $T_w$ between 0.2 ns to 2 ns, which results in a transmission occupying an ultra-wide bandwidth. The physical multipath channel $g(t)$ 17 can be expressed in terms of multipath delays and gains as:

$$g(t) = \sum_{l_g=0}^{L_g-1} \alpha_g(l_g)\delta(t - \tau_g(l_g)) \quad (1)$$

where $L_g$ is a number of transmission paths and $\tau_g(l_g) > \tau_g(l_g-1)$, $\forall l_g \in [1, L_g-1]$. The overall channel h(t) 18 comprises the convolution of the pulse waveform w(t) of pulse shaper 16 with the physical multipath channel g(t) 17, and is given by:

$$h(t) := g(t) * w(t) = \sum_{l_g=0}^{L_g-1} \alpha_g(l_g) w(t - \tau_g(l_g)) \quad (2)$$

where * stands for convolution. With $T_g := \tau_g(L_g-1)$ denoting the maximum delay spread of the dense multipath channel, we avoid intersymbol interferences (ISI) by simply choosing $T_f \geq T_g + T_w$.

The Rake receiver 20 has L fingers, and employs pulse waveform w(t) 19, which is substantially similar to the pulse waveform used in pulse shaper 16, as the correlator template. MRC is performed by MRC unit 22 at the receiver 6 to yield a decision statistic. Based on the decision statistic, an estimate of the transmitted symbol ŝ is formed by the detector 24. The multipath fading channel 17 is modeled as quasi-static, which is typical for an indoor environment. More precisely, the overall channel h(t) 18 is assumed to remain invariant over a symbol duration $N_f T_f$ seconds, but it is allowed to change from symbol to symbol.

When a single transmit antenna is deployed, the binary symbol s is transmitted with power ε, using the waveform $$s(t) = s\sqrt{\frac{\varepsilon}{N_f}} \sum_{n_f=0}^{N_f-1} w(t - n_f T_f), \; s = \pm 1 \quad (3)$$

where the pulse waveform w(t) has unit energy, i.e., $\int_0^{T_w} w^2(t)dt = 1$. With a single receive antenna, and assuming that timing offsets have been compensated accurately, the received noisy waveform corresponding to transmitted symbol s is given by:

$$r(t) = s(t) * g(t) + \eta(t) = s\sqrt{\frac{\varepsilon}{N_f}} \sum_{n_f=0}^{N_f-1} h(t - n_f T_f) + \eta(t) \quad (4)$$

where η(t) is the additive white Gaussian noise (AWGN) with zero mean and variance $\sigma^2$.

The received UWB waveform contains a large number of resolvable multipath components, $L_g$, due to the ultra-short duration of the pulse waveform w(t). In order to harvest the multipath diversity, Rake receiver 20 is employed at the receiver 6. Using the pulse waveform w(t) 19 as a reference, Rake receiver 20 with L fingers yields the correlation of the received waveform r(t) with L delayed versions of the reference waveform, namely $\{w(t-\tau(l))\}_{l=0}^{L-1}$, where $0 \leq \tau(0) < \tau(1) < \ldots < \tau(L-1) \leq T_g$. Notice that $\{T_g(l_g)\}_{l_g=0}^{L_g-1}$ in equation (2) denotes the arrival times of the physical multipath components, which are merely determined by the physical environment. Therefore, no restrictions apply to the number and/or intervals of $\tau_g(l_g)$. On the other hand, the matched filter employing the reference w(t) can not resolve multipath components whose delays differ less than one pulse duration $T_w$. The arrival times of the physical multipath components are selected such that $\tau(l) - \tau(l-1) \geq 2T_w$, $\forall l \in [0, L-1]$. The L fingers of Rake receiver 20 are selected such that $\tau(l) = 2lT_w$, $\forall l \in [0, L-1]$. Therefore, $L \leq L_g$ must hold true.

During each frame duration $T_f$, the output of the l-th finger of the Rake receiver 20 is given by:

$$x(l) = s\sqrt{\frac{\varepsilon}{N_f}} \alpha(l) + \zeta(l), \; \forall l \in [0, L-1] \quad (5)$$

where $\zeta(l) := \int_0^{T_f} \eta(t) w(t-\tau(l))dt$, and $$\alpha(l) := \int_0^{T_f} h(t) w(t - \tau(l))dt = \sum_{l_g=0}^{L_g-1} \alpha_g(l_g) R_w(\tau(l) - \tau_g(l_g)) \quad (6)$$

with $R_w(\tau) := \int_0^{T_f} w(t) w(t-\tau)dt$ denoting the autocorrelation function of w(t). It is evident that $\zeta(l)$ has zero mean and variance $\sigma^2$, since w(t) has unit energy. Also recall that the finger delays satisfy $\tau(l) - \tau(l-1) \geq T_w$, $\forall l \in [1, L-1]$; hence, $\zeta(l)$ is also white.

To maximize the signal-to-noise ratio (SNR), MRC unit 22 is used to collect the spatial diversity. In this case, MRC is employed in two levels: i) the MRC of L fingers the Rake receiver 20 per frame; and ii) the MRC of the $N_f$ frames corresponding to the same symbol. To apply MRC, the receiver 6 requires knowledge of $\{\alpha(l)\}_{l=0}^{L-1}$. Recalling the expression in equation (6), the receiver 6 requires both the multipath delays and gains. In other words, the physical multipath channel g(t) 17 needs to be acquired through, e.g., the transmission of pilot waveforms. Assuming that the receiver 6 has perfect knowledge of $\{\alpha(l)\}_{l=0}^{L-1}$, the output of MRC unit 22 per received frame $n_f \in [1, N_f]$ is:

$$\begin{aligned} y(n_f) &= \sum_{l=0}^{L-1} x(l)\alpha(l) \\ &= s\sqrt{\frac{\varepsilon}{N_f}} \sum_{l=0}^{L-1} \alpha^2(l) + \sum_{l=0}^{L-1} \alpha(l)\zeta(l) \\ &= s\sqrt{\frac{\varepsilon}{N_f}} \varepsilon_g + \xi(n_f), \; \forall n_f \in [0, N_f-1] \end{aligned} \quad (7)$$

where $\varepsilon_g := \sum_{l=0}^{L-1} \alpha^2(l)$, and $\xi(n_f) := \sum_{l=0}^{L-1} \alpha(l)\zeta(l)$. Notice that $\varepsilon_g$ represents the energy captured by the L fingers of Rake receiver 20. For fixed L, $\varepsilon_g$ is determined by the multipath channel g(t) 17, since pulse waveform w(t) was designed to have unit energy. Also notice that $\xi(n_f)$ is still a white Gaussian noise with zero mean, but its variance is now given by $\varepsilon_g \sigma^2$.

With the overall channel 18 remaining invariant over a symbol duration $N_f T_f$, the MRC of $N_f$ frames amounts to summing up $\{y(n_f)\}_{n_f=0}^{N_f-1}$ from equation (7). The resulting decision statistic corresponding to the symbol s is given below.

$$z = s\sqrt{N_f \varepsilon}\, \varepsilon_g + \sum_{n_f=0}^{N_f-1} \xi(n_f) \qquad (8)$$

The white Gaussian noise in equation (8) has zero mean, and variance $N_f \varepsilon_g \sigma^2$. When the maximum likelihood (ML) detector is used, a bit error ratio (BER) is given by:

$$P(\text{error}|\{\alpha(l)\}_{l=0}^{L-1}) = Q(\sqrt{\rho \varepsilon_g}) \qquad (9)$$

where $\rho := \varepsilon/\sigma^2$ denotes the transmitted SNR, and $Q(x):=(1/\sqrt{2\pi})\int_x^\infty \exp(-t^2/2)dt$ is the Gaussian tail function. Conditioned on $\varepsilon_g$, the Chernoff bound yields:

$$P(\text{error}|\{\alpha(l)\}_{l=0}^{L-1}) \leq \exp(-\rho \varepsilon_g/2) \qquad (10)$$

or, using the definition of $\varepsilon_g$ in equation (7), $$P(\text{error}|\{\alpha(l)\}_{l=0}^{L-1}) \leq \exp(-\rho \Sigma_{l=0}^{L-1} \alpha^2(l)/2) = \pi_{l=0}^{L-1} \exp(-\rho \alpha^2(l)/2). \qquad (11)$$

In indoor environments with multiple reflections and refractions, the gain of each path $L_g$ can be modeled as a Rayleigh distributed random variable, while the phase is a uniformly distributed random variable. Since UWB systems employ real signals, only the real part of each path gain is of interest, which has Gaussian distribution with zero mean. As combinations of Gaussian random variables, $\alpha(l)$'s are also Gaussian distributed. If the finger delays are chosen such that $\tau(l)-\tau(l-1) \geq 2T_w$, $\forall l \in [1,L-1]$, then $E[\alpha(l_1)\alpha(l_2)]=0$, $\forall l_1 \neq l_2$. In other words, $\alpha(l_1)$ and $\alpha(l_2)$ are uncorrelated $\forall l_1 \neq l_2 \in [0,L-1]$. Letting $\beta(l):=E[\alpha^2(l)]$, averaging the conditional BER over the independent Gaussian distributions of $\alpha(l)$ yields the average BER bounded as shown below.

$$P(\text{error}) \leq \prod_{l=0}^{L-1} E[\exp(-\rho \alpha^2(l)/2)] = \prod_{l=0}^{L-1}(1+\rho \beta(l))^{-\frac{1}{2}} \qquad (12)$$

At high SNR ($\rho >>$), the upper bound is given by:

$$P(\text{error}) \leq \left( \rho^L \prod_{l=0}^{L-1} \beta(l) \right)^{-\frac{1}{2}} = (\beta_L \rho)^{-\frac{L}{2}} \qquad (13)$$

where coding gain $\beta_L := (\pi_{l=0}^{L-1} \beta(l))^{1/L}$.

It may also be verified the the BER upper bound in equation (13) becomes $$\left( \frac{\rho \beta_L}{2} \right)^{-L}$$

if $\alpha(l)$'s are independent complex Gaussian random variables with variance $\beta(l)/2$. Equation (13) confirms that as the number of fingers L increases, the diversity order also increases. The increase in L can come from either denser finger delays, or larger finger delays. With dense $\tau(l)$'s, the mutual independence among $\alpha(l)$'s becomes invalid. With larger $\tau(l)$, the generally decreasing power profile of the multipath channel 17 will decrease the coding gain $\beta_L$. In fact, the diversity order comes from the energy capture of the Rake receiver 20. The energy capture however, does not increase linearly with the number of fingers L. As a result, large L does not benefit performance, but increases the implementation complexity at the receiver. Therefore, a large number of fingers L is formidable, while performance requirements are yearning for higher diversity order.

Figure 3:
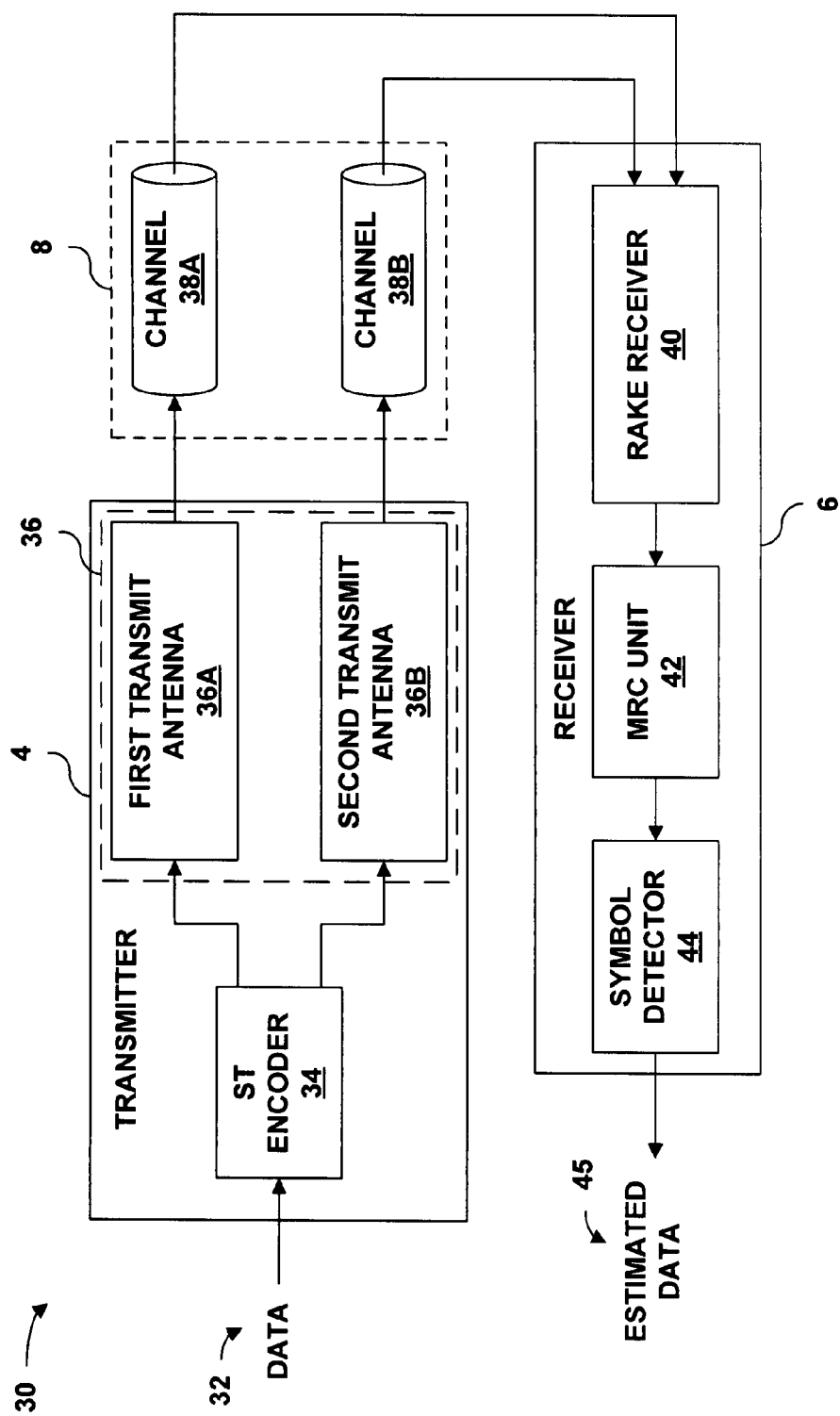
FIG. 3 is a block diagram illustrating an example multi-antenna UWB communication system having two transmit antennas and one receive antenna.

FIG. 3 is a block diagram illustrating an example multi-antenna UWB communication system 30 that has two transmit antennas 36A, 36B and a rake receiver 40. FIG. 3 illustrates a specific example of the UWB system 2 more generally illustrated in FIGS. 1 and 2. In system 30, transmitter 4 ST-encodes data 32 and transmits ST-encoded UWB waveforms via channels 8 to receiver 6, which outputs estimated data 45. The ST coding schemes may be analog for use with the analog UWB system 30 to eliminate the need for sampling at the receiver 6.

Transmitter 4 includes an ST encoder 34, a first transmit antenna 36A, and a second transmit antenna 36B. Substantially similar to the single antenna transmission described above, every binary symbol $s=\pm 1$ of data 32 is power loaded and pulse shaped before being transmitted repeatedly over $N_f$ consecutive frames of duration $T_f$. Channels 8 include a first multipath channel 38A, which carries the transmission signal waveform from first transmit antenna 36A, and a second multipath channel 38B, which carries the transmission signal waveform from second transmit antenna 36B. Receiver 6 includes a Rake receiver 40 with L fingers, MRC unit 42, and a detector 44, which generates estimated data 45.

A plurality of ST coding schemes may be applied to system 30 to encode analog transmission waveforms within data symbols to improve the diversity order compared to the single antenna transmission case described above. For example, one ST coding scheme may duplicate the symbols and use first and second transmit antennas 36 to simultaneously transmit the same symbol. Another ST coding scheme may duplicate pairs of consecutive symbols and use first and second transmit antennas 36 to simultaneously transmit the symbol pairs with alternate orders. In either case, transmission power and transmission rate per symbol may remain the same as in the single antenna transmission. In other embodiments, a multi-antenna UWB communication system may comprise any number of transmit and receive antennas and may require ST coding schemes that accommodate the number of antennas within the system.

Figure 4:
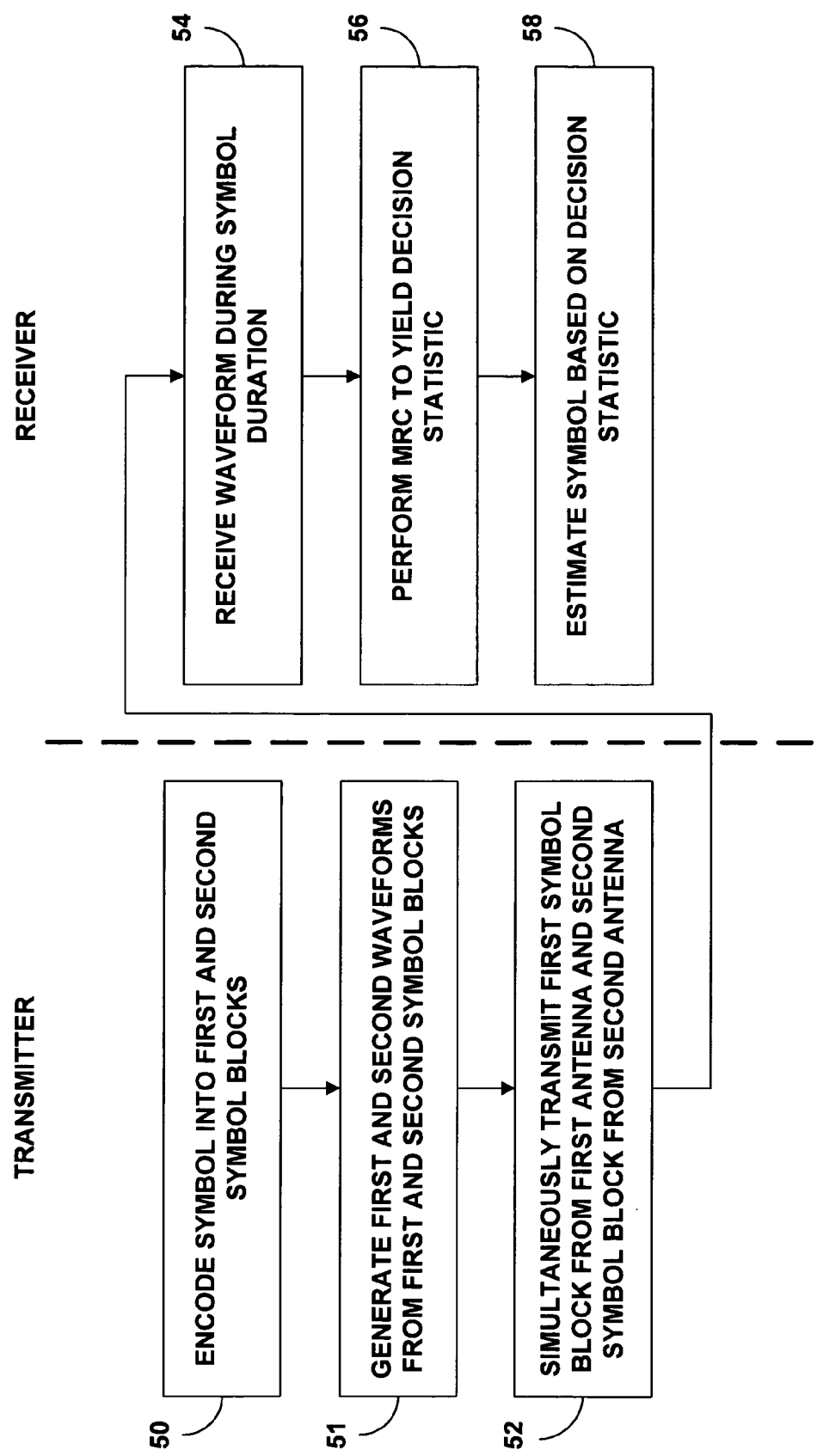
FIG. 4 is a flowchart illustrating an exemplary method of communication with a first space-time (ST) coding scheme (herein, "ST coding scheme I") applied to the multi-antenna UWB communication system from FIG. 3.

FIG. 4 is a flowchart illustrating a method of communication with an exemplary first coding scheme (ST coding scheme I) applied to the multi-antenna UWB communication system 30 from FIG. 3. ST coding scheme I transmits the same symbol over both transmit antennas 36A, 36B. In particular, ST encoder 34 duplicates each symbol in a stream of information-bearing symbols to form a first symbol block and a second symbol block (step 50). Each symbol block is then power loaded with power P/2 to ensure that a total transmit power for the symbol is equal to the single antenna transmission. Each of the symbol blocks is pulse shaped with pulse waveform w(t) to generate a first UWB waveform for the first symbol block and a second UWB waveform for the second symbol block (step 51). During each symbol duration $N_f T_f$, transmitter 4 simultaneously transmits the first symbol block waveform $$s_0(t) = s\sqrt{\frac{\varepsilon}{2N_f}} \sum_{n_f=0}^{N_f-1} (-1)^{n_f} w(t - n_f T_f) \quad (14)$$

from the first transmit antenna 36A through channel $g_0(t)$ 38A, and transmits the second symbol block waveform $$s_1(t) = s\sqrt{\frac{\varepsilon}{2N_f}} \sum_{n_f=0}^{N_f-1} w(t - n_f T_f) \quad (15)$$

from the second transmit antenna 36B through channel $g_1(t)$ 38B (step 52). In that way, the symbol is transmitted over $N_f$ frames.

During the symbol duration, Rake receiver 40 receives a noisy waveform of the transmitted symbol block waveforms (step 54). The received waveform is given below.

$$r(t) = s_0(t) * g_0(t) + s_1(t) * g_1(t) + \eta(t) \quad (16)$$

$$= s\sqrt{\frac{\varepsilon}{2N_f}} \sum_{n_f=0}^{N_f-1} [(-1)^{n_f} h_0(t - n_f T_f) + h_1(t - n_f T_f)] + \eta(t)$$

The received waveform may be separated into even and odd indexed frames of the symbol s as $r_e(t)$ and $r_o(t)$, respectively, to reduce a complexity of Rake receiver 40.

$$r(t) = \sum_{n_f=0}^{N_f'-1} [r_e(t - 2n_f T_f) + r_o(t - 2n_f T_f - T_f)], \quad (17a)$$

where $N_f' = \dfrac{N_f}{2}$ $$r_e(t) = s\sqrt{\frac{\varepsilon}{2N_f}} [h_0(t) + h_1(t)] + \eta_e(t) \text{ and} \quad (17b)$$

$$r_o(t) = s\sqrt{\frac{\varepsilon}{2N_f}} [h_1(t) + h_0(t)] + \eta_o(t)$$

Inputting the even and odd indexed frames of the symbol into Rake receiver 40, the output of the l-th finger is given by:

$$x_e(l) = s\sqrt{\frac{\varepsilon}{2N_f}} [\alpha_0(l) + \alpha_1(l)] + \zeta_e(l) \text{ for even frames} \quad (18)$$

$$x_o(l) = s\sqrt{\frac{\varepsilon}{2N_f}} [\alpha_1(l) - \alpha_0(l)] + \zeta_o(l) \text{ for odd frames}$$

where $$\alpha_m(l) := \int_0^{T_f} h_m(t) \omega(t - \tau(l)) dt \text{ for } m = 0, 1.$$

MRC unit 42 accepts the output of the L fingers of Rake receiver 40. MRC is performed on each frame of the ST-encoded signal with the output given below.

$$y_e(n_f) = \quad (19)$$
$$s\sqrt{\frac{\varepsilon}{2N_f}} \sum_{l=0}^{L-1} [\alpha_0(l) + \alpha_1(l)]^2 + \xi_e(n_f) \text{ for even frames}$$

$$y_o(n_f) =$$
$$s\sqrt{\frac{\varepsilon}{2N_f}} \sum_{l=0}^{L-1} [\alpha_1(l) + \alpha_0(l)]^2 + \xi_o(n_f) \text{ for odd frames}$$

Notice that $$\xi_e(n_f) := \sum_{l=0}^{L-1} [\alpha_0(l) + \alpha_1(l)] \zeta_e(l), \text{ and}$$

$$\xi_o(n_f) := \sum_{l=0}^{L-1} [\alpha_1(l) - \alpha_0(l)] \zeta_o(l)$$

are white Gaussian noise variables with zero mean and variances $$\sigma_{\xi_e}^2 = \sigma^2 \sum_{l=0}^{L-1} [\alpha_0(l) + \alpha_1(l)]^2$$

and $$\sigma_{\xi_o}^2 = \sigma^2 \sum_{l=0}^{L-1} [\alpha_1(l) - \alpha_0(l)]^2,$$

respectively, $\forall n_f \in [0, N_f'-1]$.

MRC is then performed on all the frames of the ST-encoded signal combined by summing $y_e(n_f)$ and $y_o(n_f)$ over the $N_f$ frames corresponding to the symbol s to yield a decision statistic (step 56)

$$z = s\sqrt{\frac{N_f \varepsilon}{2}} (\varepsilon_{g0} + \varepsilon_{g1}) + \sum_{n_f=0}^{N_f'-1} (\xi_e(n_f) + \xi_o(n_f)) \quad (20)$$

where $$\varepsilon_{gm} = \sum_{l=0}^{L-1} \alpha_m^2(l),$$  (5)

and the zero-mean noise has variance given by $N_0\sigma^2(\epsilon_{g0}+\epsilon_{g1})$. Detector 44 then estimates symbol s based on the decision statistic (step 58). Averaging over $\{\alpha_0(l),\alpha_1(l)\}_{l=0}^{L-1}$, the average bit error rate (BER) is bounded by $$P(\text{error}) \le \left(\frac{\beta_L}{2}\rho\right)^{-L}$$  (21)

at high SNR. Compared to equation (13) of the single antenna transmission case, ST coding scheme I doubles the diversity order while losing 3 dB coding gain by employing $N_t=2$ transmit antennas.

Figure 5:
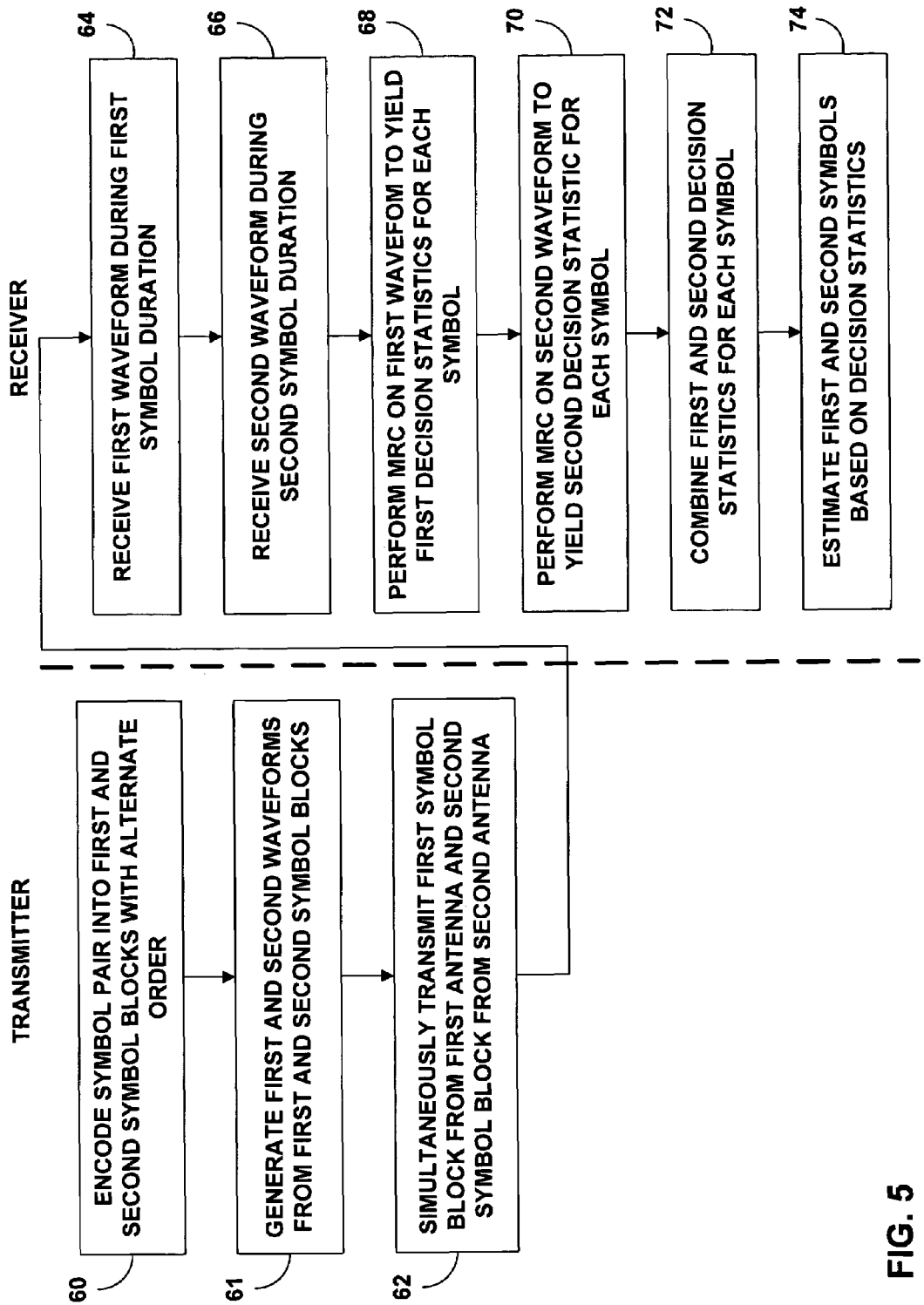
FIG. 5 is a flowchart illustrating a method of communication with a second ST coding scheme (herein, "ST coding scheme II") applied to the multi-antenna UWB communication system from FIG. 3.

FIG. 5 is a flowchart illustrating another exemplary method of communication with ST coding (ST coding scheme II) applied to the multi-antenna UWB communication system 30 from FIG. 3. In general, ST coding scheme II transmits a block of two symbols $s_a$ and $s_b$ over transmit antennas 36A, 36B in alternate order. More specifically, ST encoder 34 encodes the symbol pair into a first symbol block and a second symbol block with alternate symbol orders in each symbol block (step 60). Each of the symbol blocks is power loaded to ensure that a transmit power of each symbol is equal to the single antenna transmission power for each symbol. Each of the symbol blocks is pulse shaped with pulse waveform w(t) to generate a first UWB waveform for the first symbol block and a second UWB waveform for the second symbol block (step 61). Over two symbol durations $2N_fT_f$, transmitter 4 transmits the first symbol block waveform $$s_0(t) = s\sqrt{\frac{\varepsilon}{2N_f}}\sum_{n_f=0}^{N_f-1}[s_aw(t-2n_fT_f)-s_bw(t-2n_fT_f-T_f)]$$  (22)

from the first transmit antenna 36A through channel 38A, and transmits the second symbol block waveform $$s_1(t) = s\sqrt{\frac{\varepsilon}{2N_f}}\sum_{n_f=0}^{N_f-1}[s_bw(t-2n_fT_f)-s_aw(t-2n_fT_f-T_f)]$$  (23)

from the second transmit antenna 36B through channel 38B (step 62). In that way, each symbol is transmitted over $N_f$ frames.

During a first symbol duration, Rake receiver 40 receives a first waveform of the transmit signals (step 64)

$$r(t) = \sqrt{\frac{\varepsilon}{2Nf}}\sum_{n_f=0}^{N_f'-1}\begin{bmatrix}s_ah_0(t-2n_fT_f)+\\s_bh_1(t-2n_fT_f)+\\s_ah_1(t-2n_fT_f-T_f)-\\s_bh_0(t-2n_fT_f-T_f)\end{bmatrix}+\eta(t)$$  (24)

where $g_0(t)$ and $g_1(t)$ denote the impulse responses from the first and second transmit antennas 36, respectively, to the Rake receiver 40 during the first symbol duration and $h_0(t)$ and $h_1(t)$ denote the corresponding overall channels.

During a second symbol duration, Rake receiver 40 receives a second waveform of the transmit signals (step 66)

$$r'(t) = \sqrt{\frac{P}{2Nf}}\sum_{n_f=0}^{N_f'-1}\begin{bmatrix}s_ah_0'(t-2n_fT_f)+\\s_bh_1'(t-2n_fT_f)+\\s_ah_1'(t-2n_fT_f-T_f)-\\s_bh_0'(t-2n_fT_f-T_f)\end{bmatrix}+\eta(t)$$  (25)

where $g_0'(t)$ and $g_1'(t)$ denote the impulse responses from the first and second transmit antennas 36, respectively, to the Rake receiver 40 during the second symbol duration and $h_0'(t)$ and $h_1'(t)$ denote the corresponding overall channels.

The first received waveform, equation (24), may be separated into even and odd indexed frames as $r_e(t)$ and $r_o(t)$, respectively, to reduce complexity of Rake receiver 40. The waveform is given below.

$$r(t) = \sum_{n_f=0}^{N_f'-1}[r_e(t-2n_fT_f)+r_o(t-2n_fT_f-T_f)]$$  (26)

$$r_e(t) = \sqrt{\frac{\varepsilon}{2N_f}}[s_ah_0(t)+s_bh_1(t)]+\eta_e(t) \text{ and}$$  (27)

$$r_o(t) = \sqrt{\frac{\varepsilon}{2N_f}}[s_ah_1(t)-s_bh_0(t)]+\eta_o(t)$$

Inputting the even and odd indexed frames of the first waveform into Rake receiver 40, the output of the l-th finger is given below.

$$x_e(l) = \sqrt{\frac{\varepsilon}{2N_f}}[s_a\alpha_0(l)+s_b\alpha_1(l)]+\zeta_e(l) \text{ for even frames}$$  (28)

$$x_o(l) = \sqrt{\frac{\varepsilon}{2N_f}}[s_a\alpha_1(l)-s_b\alpha_0(l)]+\zeta_o(l) \text{ for even frames}$$

MRC unit 42 accepts the output of the L fingers of Rake receiver 40 for the first waveform. MRC is performed on each frame of each ST-encoded signal with the output given below.

$$y_a(n_f) = \sum_{l=0}^{L-1}[\alpha_0(l)x_e(l)+\alpha_1(l)x_o(l)]^2$$  (29)

-continued $$= s_a \sqrt{\frac{\varepsilon}{2N_f}} (\varepsilon_{g0} + \varepsilon_{g1}) + \xi_a(n_f)$$

$$y_b(n_f) = \sum_{l=0}^{L-1} [\alpha_1(l)x_e(l) - \alpha_0(l)x_o(l)]^2$$

$$= s_b \sqrt{\frac{\varepsilon}{2N_f}} (\varepsilon_{g0} + \varepsilon_{g1}) + \xi_b(n_f)$$

Notice that $$\xi_a(n_f) := \sum_{l=0}^{L-1} [\alpha_0(l)\zeta_e(l) + \alpha_1(l)\zeta_o(l)], \text{ and}$$

$$\xi_b(n_f) := \sum_{l=0}^{L-1} [\alpha_1(l)\zeta_e(l) - \alpha_0(l)\zeta_o(l)]$$

are white Gaussian noise variables with zero mean and variances $\sigma_{\xi_a}^2 = \sigma_{\xi_b}^2 = \sigma^2(\varepsilon_{g0} + \varepsilon_{g1})$.

MRC is then performed on all the frames of each ST-encoded signal for the first waveform combined by summing equations (29) over the first $N_f$ frames to yield a first decision statistic for each symbol (step 68)

$$z_a = s_a \sqrt{\frac{N_f \varepsilon}{8}} (\varepsilon_{g0} + \varepsilon_{g1}) + \sum_{n_f=0}^{N_f'-1} \xi_a(n_f) \quad (30)$$

$$z_b = s_b \sqrt{\frac{N_f \varepsilon}{8}} (\varepsilon_{g0} + \varepsilon_{g1}) + \sum_{n_f=0}^{N_f'-1} \xi_b(n_f)$$

where the two noise terms have identical variance $N_f \sigma^2(\varepsilon_{g0} + \varepsilon_{g1})/2$. As shown above, MRC unit 42 separates the outputs corresponding to the two symbols and decouples the detection of $s_a$ and $s_b$. After carrying out the same steps on the second received waveform, equation (25), MRC unit 42 yields a second decision statistic for each symbol (step 70)

$$z_a' = s_a \sqrt{\frac{N_f \varepsilon}{8}} (\varepsilon_{g0'} + \varepsilon_{g1'}) + \sum_{n_f=0}^{N_f'-1} \xi_a'(n_f) \quad (31)$$

$$z_b' = s_b \sqrt{\frac{N_f \varepsilon}{8}} (\varepsilon_{g0'} + \varepsilon_{g1'}) + \sum_{n_f=0}^{N_f'-1} \xi_b'(n_f)$$

where the variance of the two noise terms is $N_f \sigma^2(\varepsilon_{g0'} + \varepsilon_{g1'})/2$.

The first and second decision statistics, $z_a$ and $z_a'$, for symbol $s_a$ are combined and the first and second decision statistics, $z_b$, and $z_b'$, from symbol $s_b$ are also combined (step 72). Detector 44 then estimates symbols $s_a$ and $s_b$ based on the decision statistics (step 74). Averaging over $\{\alpha_0(l), \alpha_1(l), \alpha_0'(l), \alpha_1'(l)\}_{l=0}^{L-1}$, the average BER is bounded by $$P(\text{error}) \leq \left(\frac{\beta_L}{4}\rho\right)^{2L} \quad (32)$$

at high SNR. Compared to equation (21) of ST coding scheme I, ST coding scheme II provides twice the diversity order without increasing the number of Rake receiver fingers or the channel estimation burden. However, ST coding scheme II also loses 3 dB coding gain.

The two analog ST coding schemes were described above as being applied to PAM. In other embodiments, the coding schemes may be applied to binary PPM. With binary PPM, a symbol −1 is represented by the pulse waveform w(t) and a symbol +1 is represented by a delayed pulse waveform w(t−Δ). To avoid ISI, the frame duration is chosen such that $T_f \geq T_g + T_w + \Delta$. The delay Δ may be chosen to minimize the correlation $$\int_0^{T_f} w(t)w(t - \Delta)dt,$$

which yields Δ=0.156 ns. The delay may also be chosen to create an orthogonal PPM by setting the same correlation function to zero. Any delay greater than or equal to $T_w$ will result in orthogonal PPM, but choosing $\Delta = T_g + T_w$ results in an on-off keying (OOK). OOK ensures the orthogonality of the modulation even after propagation through frequency-selective channels with maximum delay spread up to $T_g$. However, with the same pulse amplitude and symbol SNR, OOK results in approximately half the transmission rate of PAM or PPM with small Δ.

ST coding scheme I described in reference to FIG. 4, can be applied to PPM with an arbitrary delay without modification. However, ST coding scheme II described in reference to FIG. 5, can only be applied to OOK signaling. When OOK signaling is not applied, multipath propagation destroys orthogonality between the pulse waveform and the delayed pulse waveform, which prevents decoupling of $s_a$ and $s_b$.

When OOK is applied to the ST coding schemes, noncoherent reception becomes possible as the diversity collection and symbol detection can be performed without channel information. The orthogonal, nonlinear PPM is exploited to guarantee symbol detectability and enable full spatial diversity. After modification to accommodate PPM, essentially the same steps as laid out above for PAM may be taken to yield a decision statistic. For example, the modified transmit signals for ST coding scheme I for OOK are given by:

$$s_0(t) = \sqrt{\frac{\varepsilon}{2N_f}} \sum_{n_f=0}^{N_f-1} (-1)^{n_f} w(t - n_f T_f - \tilde{s}\Delta) \text{ and}$$

$$s_1(t) = \sqrt{\frac{\varepsilon}{2N_f}} \sum_{n_f=0}^{N_f-1} w(t - n_f T_f - \tilde{s}\Delta)$$

where $\tilde{s} := (s+1)/2$. Energy at each symbol duration may be determined such that the highest energy decision statistic is used to determine the estimated symbol $\hat{s} = \arg\max_{s_0} z(s_0)$, or in the case of ST coding scheme II $(\hat{s}_a, \hat{s}_b) = \arg\max_{(s_1, s_2)} z(s_1, s_2)$.

In some embodiments, the ST coding schemes may be implemented differently than presented above. For example, antenna switching may be used to transmit the encoded symbols from the transmitter. Antenna switching allows one transmit antenna to transmit with full power while the other transmit antenna is shut off, and vise versa. For example, the transmit signals of ST coding scheme I for this case are given by $$s_0(t) = s\sqrt{\frac{\varepsilon}{N_f}} \sum_{n_f=0}^{N_f'-1} w(t - 2n_f T_f) \text{ and}$$

$$s_1(t) = 2\sqrt{\frac{\varepsilon}{N_f}} \sum_{n_f=0}^{N_f'-1} w(t - 2n_f T_f - T_f).$$

The conditional BER remains the same as equation (21) determined in the original implementation described above.

In another possible implementation, transmitter 4 includes a frame interleaver that permutes the frames of the blocks of symbols to interleave the frames for use in generating the multiple UWB waveforms. For example, a $N_f \times N_i$ frame interleaver may be included in the ST encoder. For example, in the case of ST coding scheme II, the $N_i$ repeated versions of $s_a$ and $s_b$ are fed to the interleaver column-wise and read out row-wise. Choosing the interleaver depth $N_i$ to be any even factor of $N_f$ can readily modify ST coding scheme II to achieve a diversity order of $LN_i$ with two transmit antennas and a MRC-Rake receiver with L fingers. The upper bound of the averaged BER for ST coding scheme II including the frame interleaver is given below.

$$P(\text{error}) \le \left(\frac{\beta_L}{2N_i}\rho\right)^{-LN_i} \quad (33)$$

Compared to equation (21) of ST coding scheme I, frame interleaving for ST coding scheme II achieves a diversity $N_i$ times greater. However, frame interleaving also generates a decoding delay of $N_i$ frames and a loss in coding gain by a factor of $N_i$.

The presented ST coding schemes may also be implemented in a UWB system including more than one receive antenna. Equipping the receiver with Nr>1 antennas enables receive diversity. Assuming the receive antennas are spaced sufficiently apart so that the channels are mutually independent, receive diversity can be readily exploited with MRC. The upper bound of the averaged BER for ST coding scheme I is given by:

$$P(\text{error}) \le \left(\frac{\beta_L}{2}\rho\right)^{-N_r L} \quad (34)$$

and for ST coding scheme II $$P(\text{error}) \le \left(\frac{\beta_L}{2N_i}\rho\right)^{-N_r LN_i} \quad (35)$$

where ST coding scheme II includes a $N_f \times N_i$ frame interleaver. Moreover, because the PAM/PPM UWB transmissions are real by design, the ST coding schemes do not suffer rate loss when more than two transmit antennas are included in a UWB communication system.

FIGS. 6-14 are graphs illustrating results of simulations and comparisons that validate the analyses and designs described above. In all cases, parameters of the channel model are chosen as $\Gamma$=33 ns, $\gamma$=5 ns, $1/\Lambda$=2 ns, and $1/\lambda$=0.5 ns. The parameter r is chosen to be 0.1225 ns to obtain a pulse width of 0.7 ns. The frame duration is chosen to be $T_f$=100 ns, while the maximum delay spread is $T_g$=99 ns.

Figure 6:
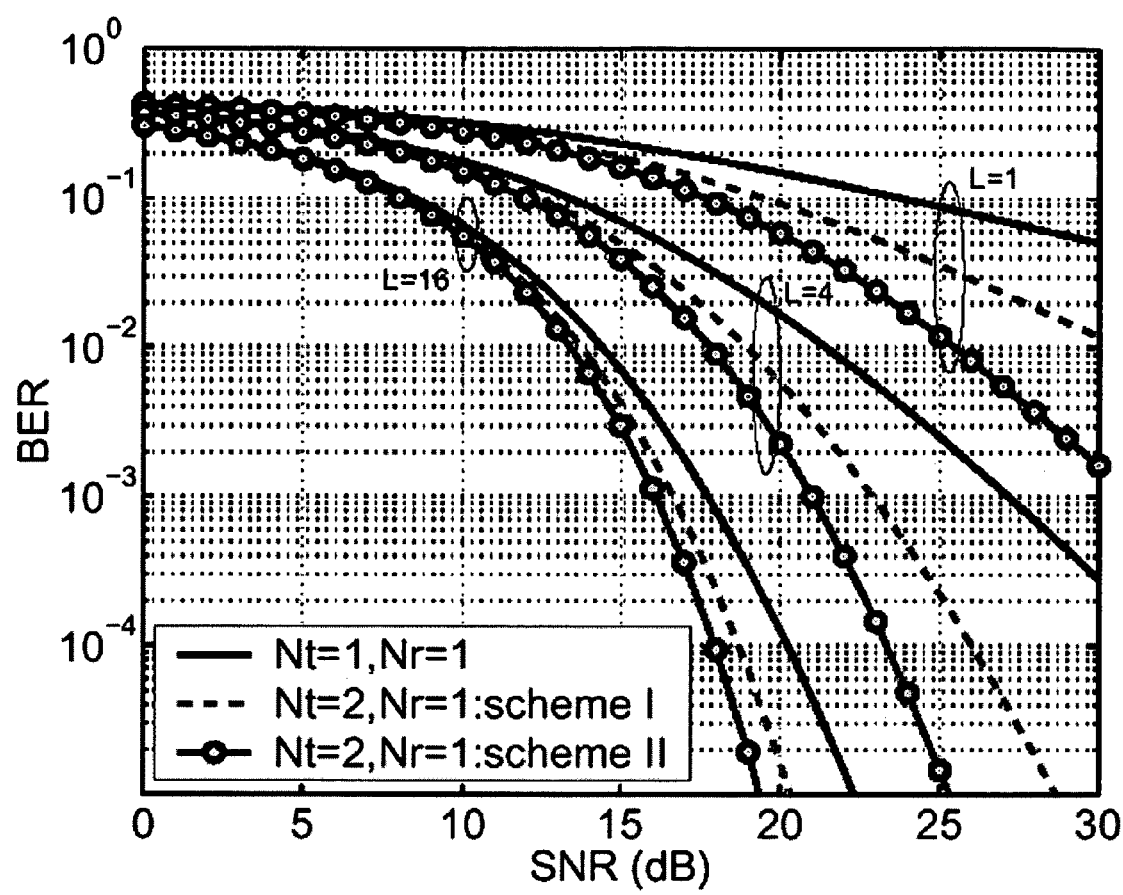
FIGS. 6-14 are graphs illustrating results of simulations and comparisons that validate analyses and designs of UWB communication systems and the ST coding schemes.

FIG. 6 is a graph illustrating results of a comparison of BER performance for single antenna transmission and ST coding schemes I and II with two transmit antennas and one receive antenna. BER vs. SNR curves are plotted in FIG. 6 with the number of fingers, L, of the Rake receiver being 1, 4, and 16. For all values of L, ST coding schemes I and II provide, respectively, twice and four times the diversity order of the single antenna transmission. It can also be seen in FIG. 6 that as the number of Rake receiver fingers L increases, the coding gain is held back.

Figure 7:
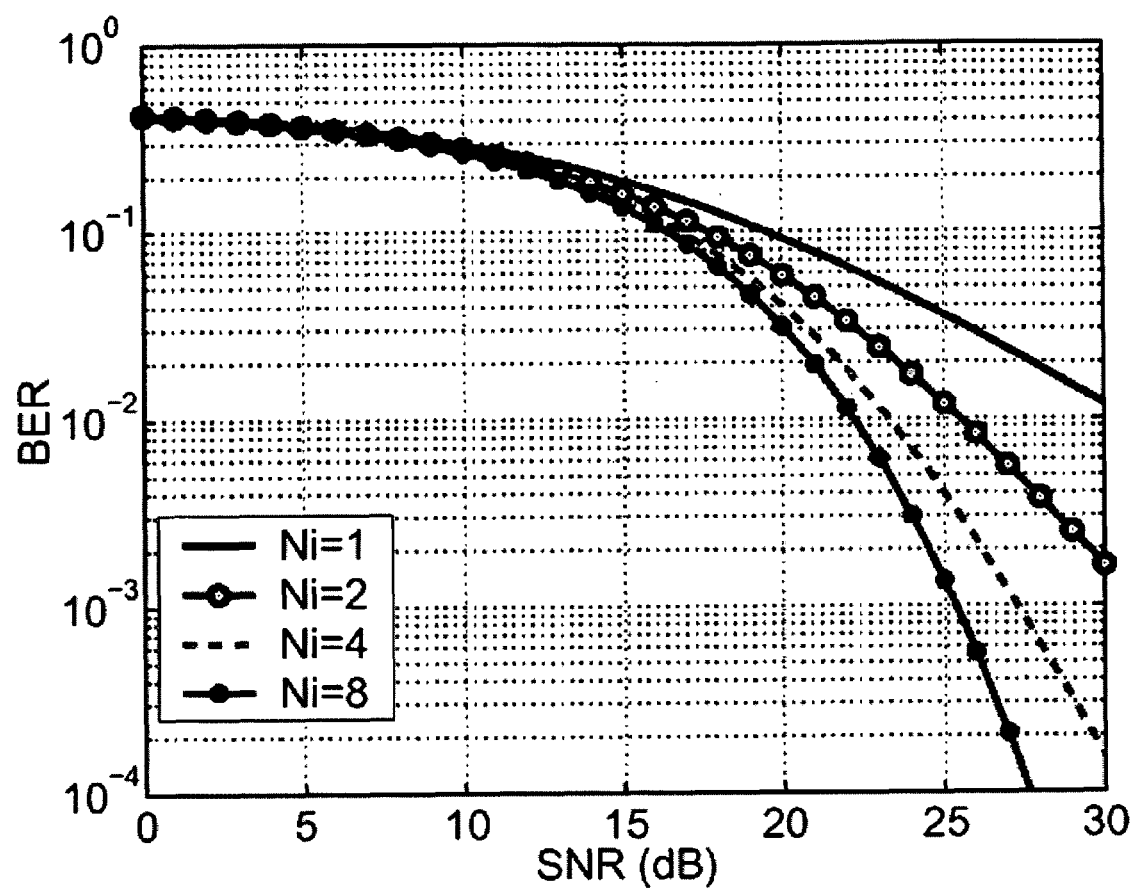

FIG. 7 is a graph illustrating results of a simulation of the effects of various interleaver depths, $N_i$, on BER performance for ST coding scheme II. In this case, ST coding scheme II includes PAM, a Rake receiver with L=1 fingers, two transmit antennas, and one receive antenna. FIG. 7 shows that the diversity order increases with increasing $N_i$. In addition, coding gain loss and decoding delay length also increases with increasing $N_i$.

Figure 8:
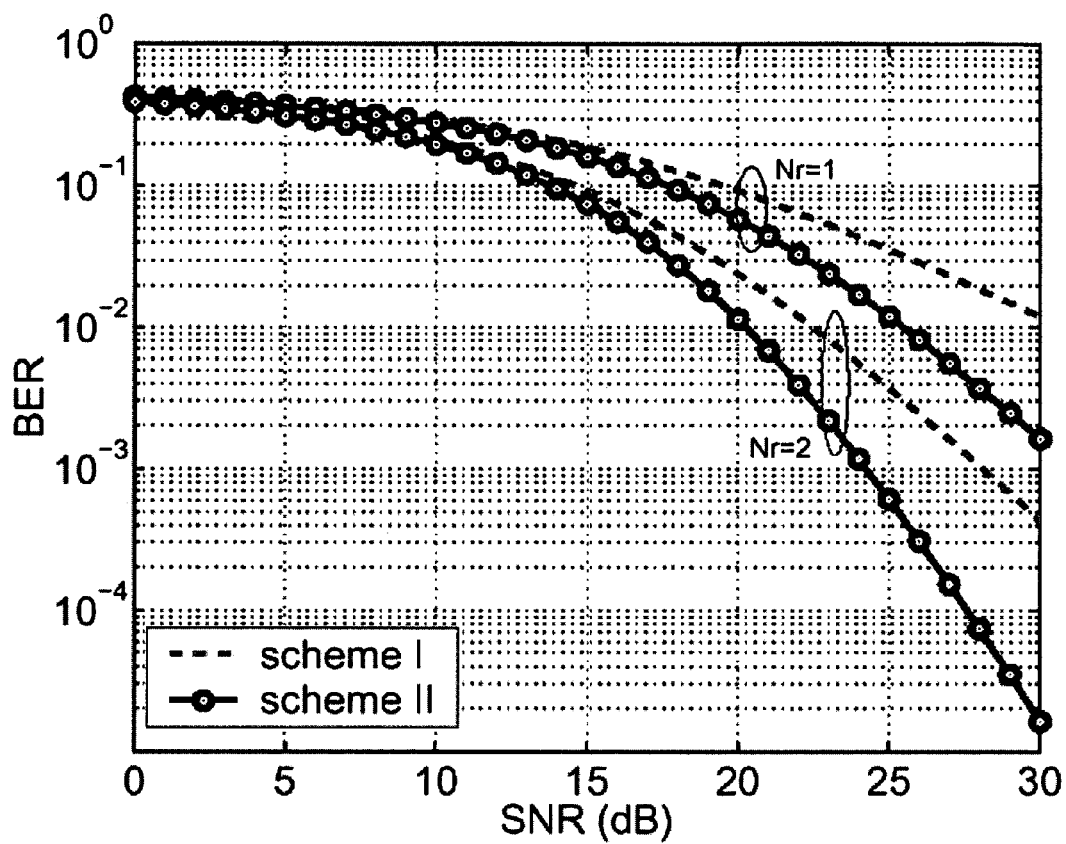

FIG. 8 is a graph illustrating results of a comparison of BER performance for ST coding schemes I and II with one receive antenna and with two receive antennas. For both coding schemes the addition of a second receive antenna doubles the diversity gain. However, ST coding scheme I with $N_r$=2 provides the same diversity order, but 3 dB more coding gain than ST coding scheme II with $N_r$=2.

Figure 9:
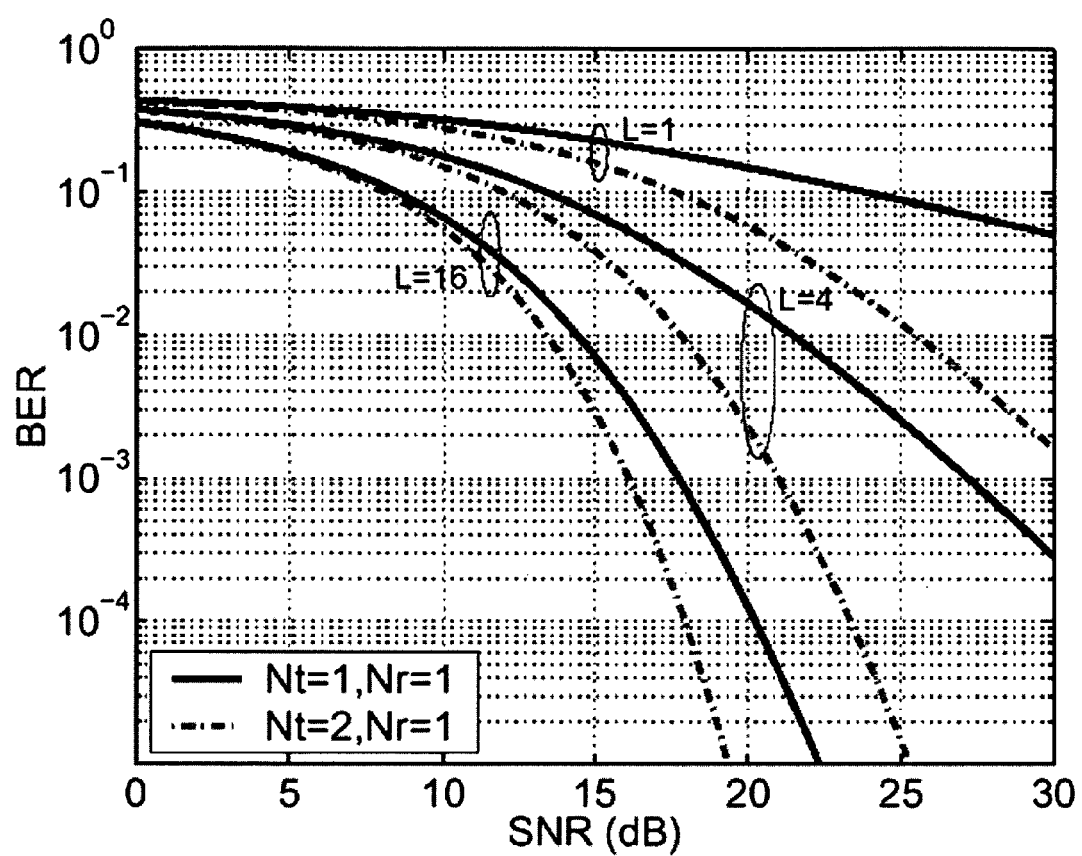
Figure 10:
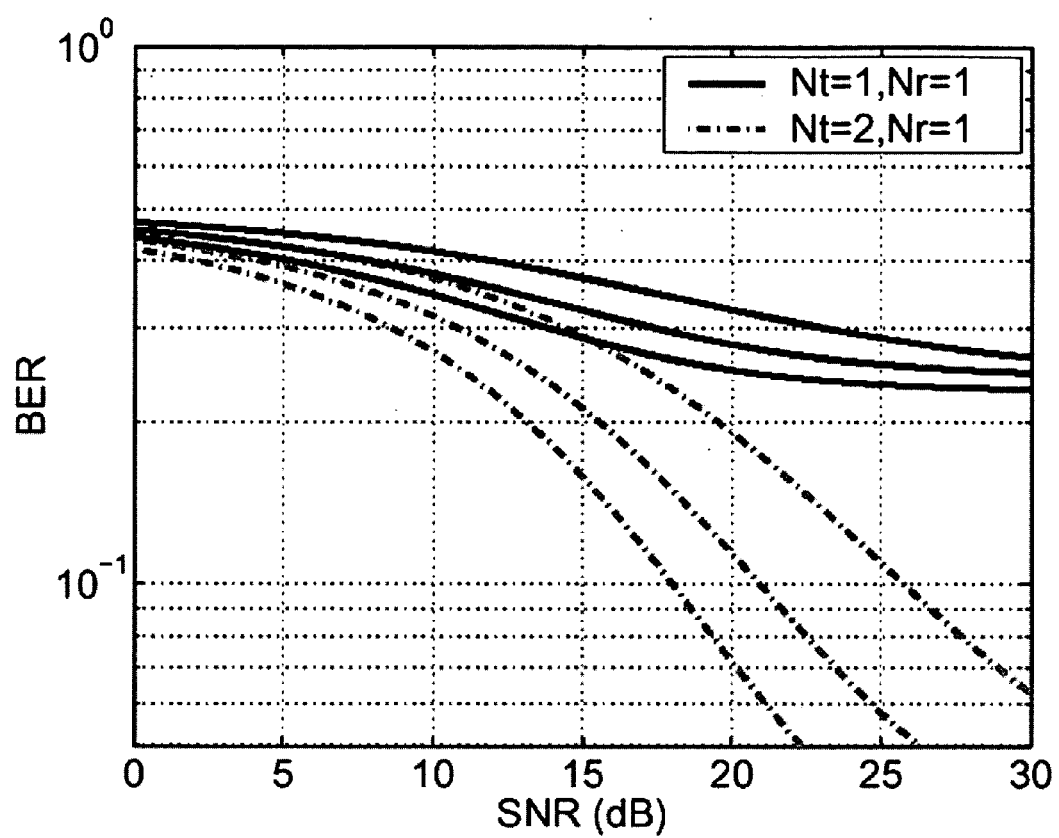

FIGS. 9 and 10 are graphs illustrating results of a simulation of the effects of timing jitter on BER performance for single antenna and multi-antenna transmissions. FIG. 9 shows BER vs. SNR curves for a single transmit and receive antenna system and a two transmit and one receive antenna system employing ST coding scheme II with L=1, 4, and 16 without timing jitter. As can be seen, the diversity gain increases with both L and $N_r$. FIG. 10 shows BER vs. SNR curves for the same systems in the presence of timing jitter. Performance degradation is observed for both systems and larger L values are seen to not make much difference in the diversity order. However, the multi-antenna system outperforms the single antenna system for all values of L.

Figure 11:
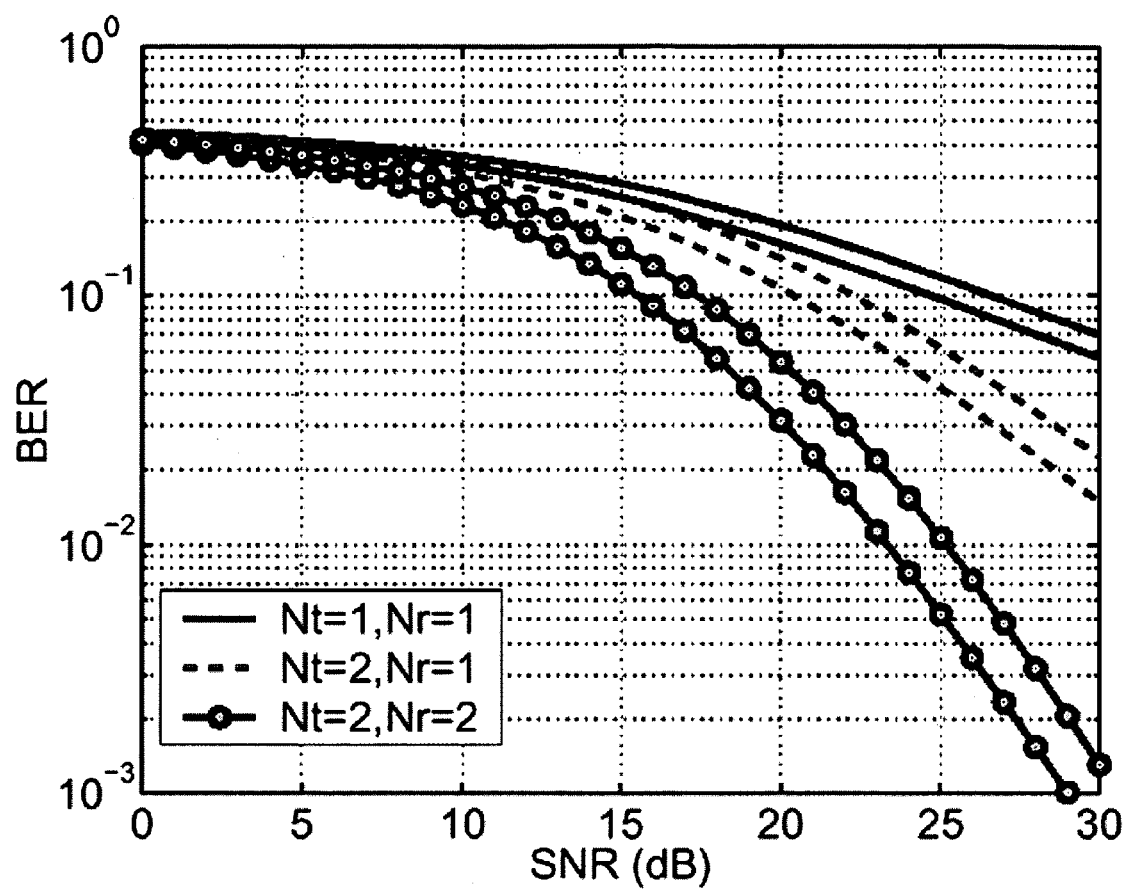
Figure 12:
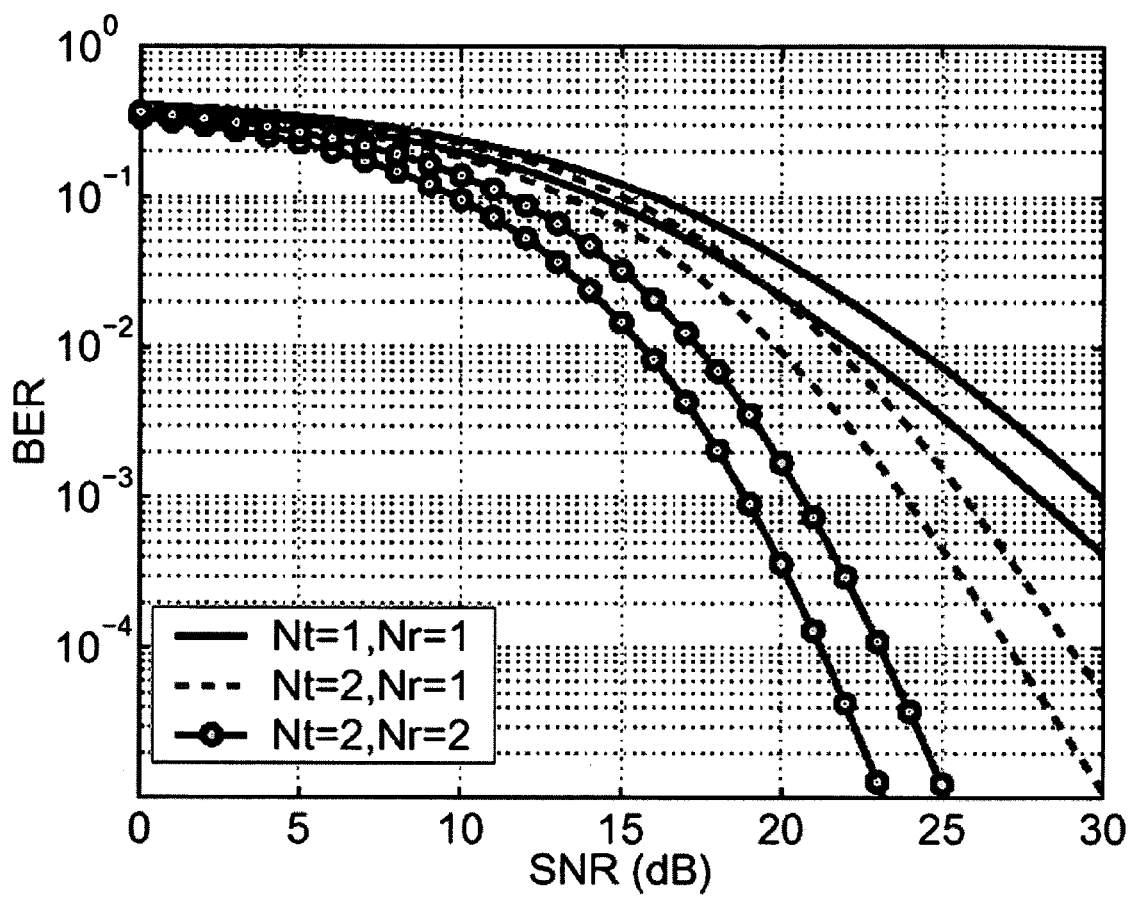

FIGS. 11 and 12 are graphs illustrating results of a comparison of BER performance for single antenna transmission and ST coding scheme I with one receive antenna and two receive antennas. In FIG. 11, ST coding scheme I includes PPM and a Rake receiver with L=1 fingers. The upper curve is obtained with modulation delay $\Delta$=1 ns, which yields an orthogonal PPM. The lower curve is obtained with modulation delay $\Delta$=0.156 ns, which maximizes the correlation. For both delay values, multiple antenna systems provide higher diversity order. The same result can be seen in FIG. 12 for a Rake receiver with L=4 fingers.

Figure 13:
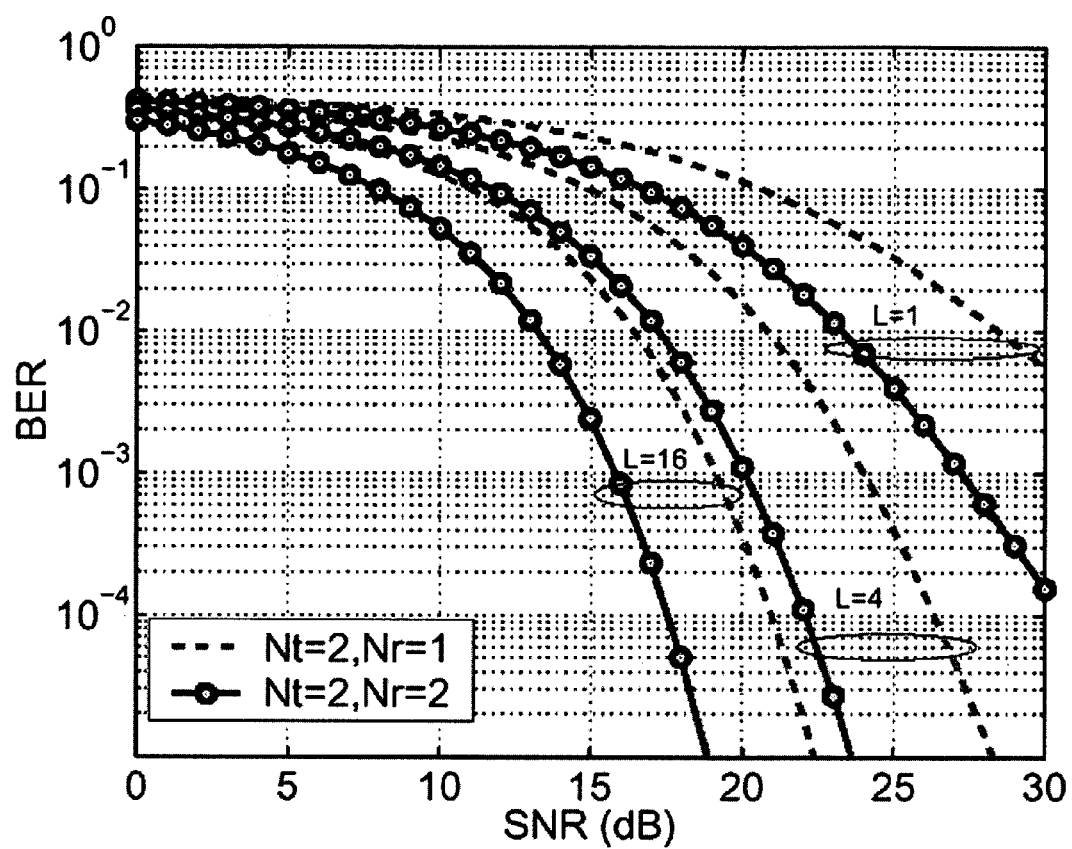

FIG. 13 is a graph illustrating results of a comparison of BER performance for ST coding scheme II with one receive antenna and two receive antennas. In this case, ST coding scheme II includes OOK, a special case of PPM with $\Delta=T_g+T_\omega$, with coherent reception and a Rake receiver with L=1, 4, and 16 fingers. The diversity order increases with both L and $N_r$.

Figure 14:
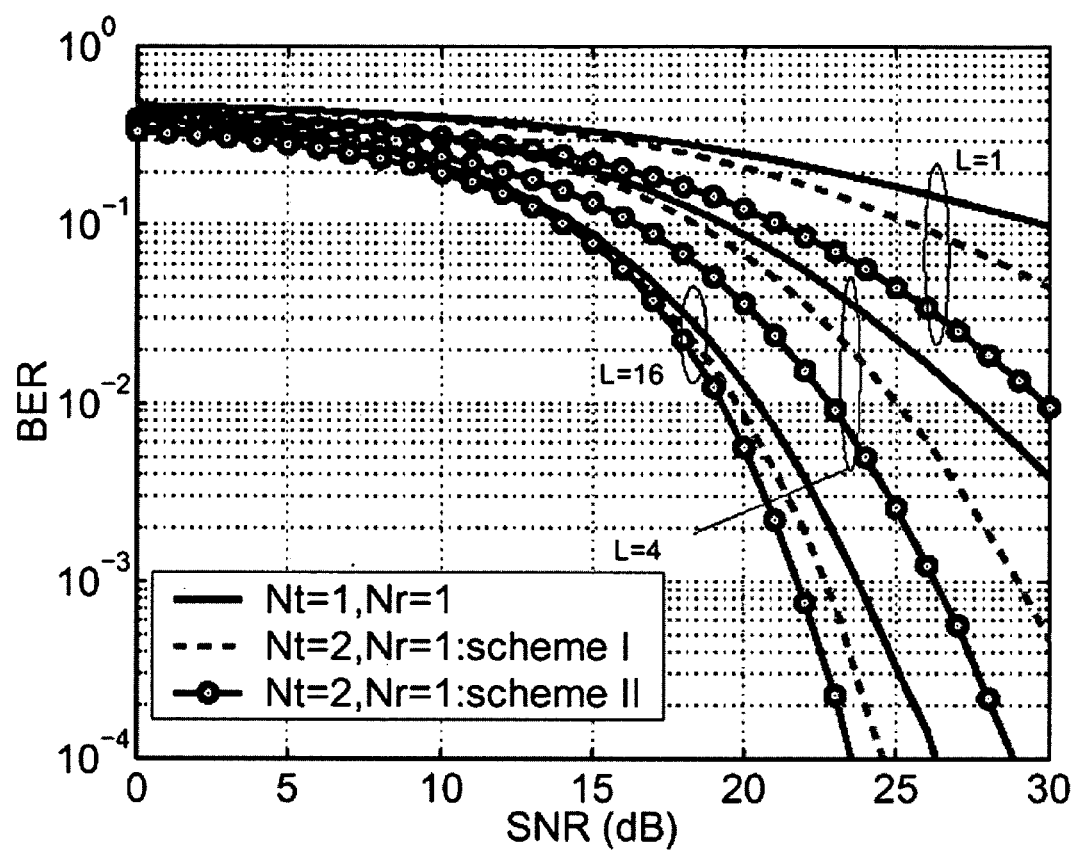

FIG. 14 is a graph illustrating results of a comparison of BER performance for single antenna transmission and ST coding scheme I and II with noncoherent reception. In this case, ST coding schemes I and II include OOK with noncoherent reception and a Rake receiver with L=1, 4, and 16 fingers. The diversity order increases with the coding scheme and with L. However, performance loss is observed when the curves of ST coding scheme II are compared to the coherent reception curves for $N_t=2$ and $N_r=1$ from FIG. 13. The performance loss with noncoherent reception is a tradeoff for the advantage of foregoing channel estimation.

Various embodiments of a multi-antenna UWB communication system including ST coding has been described. As one example, an UWB system including two transmit antennas and one receive antenna has been described. Two exemplary analog ST coding schemes are presented herein in reference to the exemplary two-transmit, one-receive UWB ST-coding system. The ST coding schemes encode analog waveforms within data symbols to allow transmission via multiple antennas. Applying the ST coding schemes to the UWB system enhances spatial and multipath diversity gains without increasing receiver complexity. Furthermore, several possible embodiments of the UWB system and the ST coding schemes have been described.

Nevertheless, various modifications may be made without departing from the techniques described herein. For example, a multi-antenna UWB communication system may be designed using a variety of components and layouts not described herein. Furthermore, any number of transmit and/or receive antennas may be implemented in the UWB system. ST coding schemes other than the examples presented may be used to enable multi-antenna transmission and spatial diversity.

The described techniques can be embodied in a variety of devices that communicate using ultra wideband communication, including wireless personal area networks (WPAN), sensor networks, base stations, mobile phones, laptop computers, handheld computing devices, personal digital assistants (PDA's), and the like. The devices may include a digital signal processor (DSP), field programmable gate array (FPGA), application specific integrated circuit (ASIC) or similar hardware, firmware and/or software for implementing the techniques. If implemented in software, a computer-readable medium may store computer readable instructions, i.e., program code, that can be executed by a processor or DSP to carry out one of more of the techniques described above. For example, the computer-readable medium may comprise random access memory (RAM), read-only memory (ROM), non-volatile random access memory (NVRAM), electrically erasable programmable read-only memory (EEPROM), flash memory, or the like. The computer-readable medium may comprise computer readable instructions that when executed in a wireless communication device, cause the wireless communication device to carry out one or more of the techniques described herein. These and other embodiments are within the scope of the following claims.

The invention claimed is:

1. A method comprising:
processing a stream of information-bearing symbols to form a plurality of symbol blocks, wherein each symbol block comprises more than one of the information bearing symbols;
generating multiple ultra-wideband (UWB) waveforms from the symbol blocks, wherein each of the UWB waveforms convey the symbols of their respective symbol blocks as pulses repeated over a plurality of frames; and
transmitting the UWB waveforms over different antennas as a space-time coded UWB communication.

2. The method of claim 1,
wherein processing a stream of information-bearing symbols comprises parsing the stream of symbols into blocks of symbol pairs,
wherein generating multiple UWB waveforms comprises generating a first UWB waveform to transmit the symbol pairs in a first order and a second UWB waveform to transmit the symbol pairs in a second order opposite from the first order, and
wherein transmitting the UWB waveforms comprises simultaneously transmitting the first UWB waveform from a first transmit antenna and the second UWB waveform from a second transmit antenna.

3. The method of claim 1, wherein processing a stream of information-bearing symbols comprises:
parsing the stream into a first block of symbols while maintaining an order of the stream of symbols; and
permuting the symbols of the first block to form a second block in which the symbols are in an order different from the order of the stream of symbols.

4. The method of claim 1, wherein generating multiple UWB waveforms power loading and pulse shaping each of the symbols of the symbol blocks to generate the pulses for transmission repeatedly over the plurality of frames.

5. The method of claim 1, wherein generating multiple UWB waveforms comprises applying pulse amplitude modulation.

6. The method of claim 1, wherein generating multiple UWB waveforms comprises applying pulse position modulation.

7. The method of claim 1, wherein generating multiple UWB waveforms comprises:
permuting the frames to interleave the frames; and
generating multiple UWB waveforms from the interleaved frames.

8. The method of claim 1, further comprising:
receiving the transmitted UWB waveforms through a wireless communication channel with a plurality of receive antennas; and
performing maximum ratio combining (MRC) on the plurality of frames to produce a stream of estimate symbols.

9. The method of claim 8, wherein receiving the transmitted UWB waveforms comprises:
receiving a first UWB waveform of the transmit signals with a receive antenna;
receiving a second UWB waveform of the transmit signals with the receive antenna, and wherein performing MRC comprises:
performing maximum ratio combining (MRC) on the first UWB waveform to yield a first decision statistic;
performing MRC on the second UWB waveform to yield a second decision statistic; combining the first and second decision statistics to create a combined decision statistic; and
outputting an estimate symbol based on the combined decision statistic.

10. The method of claim 8, further comprising separating the received UWB waveforms into even and odd indexed frames at the receive antennas.

11. A method comprising:
    processing a stream of information-bearing symbols to form a plurality of symbol blocks, wherein each symbol block comprises one or more of the information bearing symbols;
    generating multiple ultra-wideband (UWB) waveforms from the symbol blocks, wherein each of the UWB waveforms convey the symbols of their respective symbol blocks as pulses repeated over a plurality of frames;
    transmitting the UWB waveforms over different antennas as a space-time coded UWB communication,
    wherein processing a stream of information-bearing symbols comprises duplicating each symbol to form a first symbol block and a second symbol block each comprising the same information bearing symbol,
    wherein generating multiple UWB waveforms comprises generating a first UWB waveform from the first symbol block and a second UWB waveform from the second symbol block, and
    wherein transmitting the UWB waveforms comprises simultaneously transmitting the first UWB waveform from a first transmit antenna and the second UWB waveform from a second transmit antenna.

12. A wireless communication device comprising:
    a space-time (ST) encoder that processes a stream of information-bearing symbols to form a plurality of ST-encoded symbol blocks, wherein each symbol block comprises more than one of the information bearing symbols;
    a plurality of pulse shapers that generate multiple ultra-wideband (UWB) waveforms from the symbol blocks, wherein each of the UWB waveforms convey the symbols of their respective symbol blocks as pulses repeated over a plurality of frames; and
    a plurality of antennas that transmit the UWB waveforms over a wireless communication channel.

13. The wireless communication device of claim 12, wherein the ST encoder parses the stream of symbols into blocks of symbol pairs and, for each symbol pair, generates a first symbol block that stores the pair of symbols in a first order and a second symbol block that duplicates the pair of symbols and stores the pair of symbols in a second order opposite from the first order.

14. The wireless communication device of claim 12, further comprising a frame interleaver that permutes the frames to interleave the frames.

15. The wireless communication device of claim 12, wherein the pulse shapers modulate the pulses for transmission repeatedly over the frames.

16. The wireless communication device of claim 12, wherein the pulse shapers apply pulse amplitude modulation to the pulses.

17. The wireless communication device of claim 12, wherein the pulse shapers apply pulse position modulation.

18. The wireless communication device of claim 12, wherein the wireless communication device comprises one of a base station and a mobile device.

19. The wireless communication device of claim 12, wherein the ST encoder parses the stream into a first block of symbols while maintaining an order of the stream of symbols, and permutes the symbols of the first block to form a second block in which the symbols are in an order different from the order of the stream of symbols.

20. A wireless communication device comprising:
    a space-time (ST) encoder that processes a stream of information-bearing symbols to form a plurality of ST-encoded symbol blocks, wherein each symbol block comprises one or more of the information bearing symbols;
    a plurality of pulse shapers that generate multiple ultra-wideband (UWB) waveforms from the symbol blocks, wherein each of the UWB waveforms convey the symbols of their respective symbol blocks as pulses repeated over a plurality of frames;
    a plurality of antennas that transmit the UWB waveforms over a wireless communication channel, wherein the ST encoder duplicates each symbol to form a first symbol block and a second symbol block each comprising the same information bearing symbol, and the plurality of pulse generators generate a first UWB waveform from the first symbol block and a second UWB signal from the second symbol block for simultaneous transmission via the plurality of antennas.

21. A wireless communication device comprising:
    a plurality of antennas to receive a plurality of space-time (ST) encoded ultra wideband (UWB) waveforms through a wireless communication channel, each ST encoded UWB waveform having a plurality of information-bearing symbols within a symbol block that are conveyed as pulses repeated over a plurality of frames; and
    a maximum ratio combining (MRC) unit that processes the ST encoded UWB signals and produces a stream of estimate symbols.

22. The wireless communication device of claim 21, wherein the received UWB waveforms are separated into even and odd indexed frames at the receive antennas.

23. The wireless communication device of claim 21,
    wherein the plurality of antennas comprise a first antenna that receives a first UWB waveform and a second antenna that receives a second UWB waveform, and wherein the MRC unit:
    performs maximum ratio combining (MRC) on the first UWB waveform to yield a first decision statistic,
    performs MRC on the second UWB waveform to yield a second decision statistic,
    combines the first and second decision statistics to create a combined decision statistic, and
    outputs one of the estimate symbols based on the combined decision statistic.

24. The wireless communication device of claim 21, wherein the wireless communication device comprises one of a base station and a mobile device.

25. An ultra-wideband communication system comprising:
    a transmitter that outputs a plurality of space-time (ST) encoded ultra wideband (UWB) waveforms via a plurality transmit antennas, each ST encoded UWB waveform having a plurality of information-bearing symbols within a symbol block that are conveyed as pulses repeated over a plurality of frames; and
    a receiver that receives the plurality of ST-encoded UWB waveforms via a wireless communication channel, and performs maximum ratio combining (MRC) on the UWB signals to produce estimate symbols.

26. The ultra-wideband communication system of claim 25, wherein the receiver comprises a plurality of receive antennas to receive the UWB waveforms.

27. The ultra-wideband communication system of claim 26, wherein the received UWB waveforms are separated into even and odd indexed frames at the receive antennas.

* * * * *